US010904905B2

(12) United States Patent
Prakash et al.

(10) Patent No.: US 10,904,905 B2
(45) Date of Patent: Jan. 26, 2021

(54) VARIABLE PACKET DELAY BUDGETS FOR WIRELESS COMMUNICATIONS

(71) Applicant: QUALCOMM Incorporated, San Diego, CA (US)

(72) Inventors: Rajat Prakash, San Diego, CA (US); Vinay Joseph, San Diego, CA (US); Xipeng Zhu, San Diego, CA (US); Gavin Bernard Horn, La Jolla, CA (US); Ozcan Ozturk, San Diego, CA (US); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/579,792

(22) Filed: Sep. 23, 2019

(65) Prior Publication Data

US 2020/0107339 A1    Apr. 2, 2020

Related U.S. Application Data

(60) Provisional application No. 62/739,130, filed on Sep. 28, 2018.

(51) Int. Cl.
*H04W 72/12* (2009.01)
*H04L 12/841* (2013.01)

(52) U.S. Cl.
CPC ....... *H04W 72/1257* (2013.01); *H04L 47/283* (2013.01); *H04W 72/1263* (2013.01)

(58) Field of Classification Search
CPC . H04L 47/283; H04L 1/0018; H04L 41/5003; H04W 28/0268; H04W 72/1257; H04W 72/1263
See application file for complete search history.

(56) References Cited

U.S. PATENT DOCUMENTS

2014/0126406 A1*  5/2014  Ibanez ............... H04L 47/283
                                                          370/252
2015/0373774 A1* 12/2015  Belghoul ........... H04L 43/0858
                                                          370/252

(Continued)

FOREIGN PATENT DOCUMENTS

WO    WO-2018083653 A1    5/2018

OTHER PUBLICATIONS

Huawei et al., "New Key Issue and Solution for the Enhancement of PDB Provision", 3GPP Draft; S2-188231 TR23.725_New_Key Issue and Solution for Enchancement of PDB Provision V1, 3rd Generation Partnership Project (3GPP), Mobile Competence Centre, 650, Route Des Lucioles, F-06921, Sophia-Antipolis Cedex, France, Aug. 20, 2018-Aug. 24, 2018 Aug. 14, 2018, XP051502938, Retrieved from the Internet: URL:http://www.3gpp.org/ftp/tsg%5Fsa/WG2%5FArch/TSGS2%5F128BIS%5FSophia%5FAntipolis/Docs/S2%2D188231%2Ezip [retrieved on Aug. 14, 2018] paragraph [0001]; figure 1, figures 6.X.2.1-1, 4 pages.

(Continued)

*Primary Examiner* — Mounir Moutaouakil
(74) *Attorney, Agent, or Firm* — Holland & Hart LLP

(57) ABSTRACT

Generally, the described techniques provide for a core network signaling to a base station a delay budget configuration that indicates a determined latency for communications between a core network, base station, and a user equipment (UE). In some cases, the core network may determine a first variable delay budget between the core network and a base station based on capability information associated with the wireless communications system. The core network may transmit the delay budget configuration to the base station, where the delay budget configuration may include the first delay budget. The base station may be able to determine a delay between the UE and the base station based on the delay budget configuration. Using the delay (Continued)

budget configuration, the base station may then schedule communications with the UE.

56 Claims, 16 Drawing Sheets

(56) References Cited

U.S. PATENT DOCUMENTS

2018/0279319 A1  9/2018  Yu et al.
2019/0288953 A1  9/2019  Yavuz et al.
2020/0205177 A1  6/2020  Prakash et al.

OTHER PUBLICATIONS

International Search Report and Written Opinion—PCT/US2019/052723—ISA/EPO—dated Nov. 19, 2019.
Samsung: "QoS Parameter—Packet Delay Budget", 3GPP Draft; S2-163704 QoS Parameter—Packet Delay Budget, 3rd Generation Partnership Project (3GPP), Mobile Competence Centre, 650, Route Des Lucioles, F-06921, Sophia-Antipolis Cedex, France, vol. SA WG2, No. Vienna, Austria; Jul. 11, 2016-Jul. 15, 2016 Jul. 10, 2016, XP051118286, Retrieved from the Internet: URL:http://www.3gpp.org/ftp/Meetings_3GPP_SYNC/SA2/Docs/ [retrieved on Jul. 10, 2016] p. 1, line 12—p. 2, line 8; figures 1,2 p. 2, line 3-line 18 tables 6.2.2.1-1 paragraph [6.2.2.1], 9 pages.

* cited by examiner

VARIABLE PACKET DELAY BUDGETS FOR WIRELESS COMMUNICATIONS

CROSS REFERENCE

The present Application for Patent claims the benefit of U.S. Provisional Patent Application No. 62/739,130 by PRAKASH et al., entitled "DELAY BUDGET FOR LOW LATENCY COMMUNICATIONS," filed Sep. 28, 2018, assigned to the assignee hereof, and which is expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some cases, various applications (e.g., motion control, discrete manufacturing) may utilize relatively strict reliability and latency requirements.

SUMMARY

The described techniques relate to improved methods, systems, devices, and apparatuses that support a delay budget for low latency communications. Generally, the described techniques provide for a first device, such as a core network entity, signaling to a second device, such as a base station, a delay budget configuration that indicates a determined latency for communications between a core network and a base station, between a user equipment (UE) and a base station, or between a core network and a UE. For example, in the case of a downlink transmission, the delay budget configuration may include a first variable delay budget incurred between a core network entity and a radio access node (at a base station for example). The delay budget configuration may also include a second variable delay budget incurred between a base station and a UE. Together, this total delay budget may define a total latency for communications between a UE and a core network entity.

According to some aspects, one or more delay budgets may be divided within the radio access network (RAN). For instance, the RAN may include a central unit (CU) and a distributed unit (DU). The delay budget configuration may include one or more delay budgets (e.g., variable or non-variable delay budgets) incurred between the CU and the DU. For instance, the delay budget configuration may indicate a balanced budget (e.g., an even split delay budget) between the CU, DU, and the UE. In such cases, the delay budget configuration may indicate a division of the second variable delay budget (e.g., between a base station of the RAN and the UE) into respective delay budgets for each of the CU to DU and DU to UE. In other examples, delay budgets between the RAN and the UE may be unbalanced (e.g., unevenly split) between the CU, DU, and the UE or may be defined separate from the second variable delay budget.

In some cases, the core network entity may determine the first variable delay budget based on configured capability information associated with the wireless communications system. For example, a core network entity may determine the first variable delay budget based on RAN capabilities, such as at least one of a subcarrier spacing to be used for communications, support for mini-slot communications, a frame structure configuration, a radio frequency spectrum bandwidth, a bandwidth part, and the like. Additionally or alternatively, the core network entity may determine the first variable delay budget based on a capability of the communication to be used to communicate with the base station. Additionally or alternatively, the core network entity may determine the first variable delay budget based on one or more capabilities of the wireless communications system, for example, a delay bound associated with the transport of communications within the wireless communications system, which may be configured based on, for example, a traffic class. The core network entity may similarly determine a second variable delay budget for communications between, for example, the UE and the core network entity.

The core network entity may transmit the delay budget configuration to the base station, where the delay budget configuration may include the first variable delay budget and the second delay budget, which may be variable in some cases. By signaling these two parameters to the base station, the base station may also be able to determine a delay between the UE and the base station based on the total delay and the delay between the core network entity and the base station. Using the delay budget configuration, the base station may schedule communications with another device, such as a UE.

A method of wireless communications is described. The method may include identifying a communication link for traffic associated with a first latency type between a UE and a core network node via a radio access node, determining a first variable delay budget for communications of the first latency type between the radio access node and the core network node via the communication link, and transmitting, to the radio access node, a delay budget configuration indicating the first variable delay budget and a second variable delay budget for communications of the first latency type between the UE and the core network node via the communication link.

An apparatus for wireless communications is described. The apparatus may include a processor, memory in electronic communication with the processor, and instructions stored in the memory. The instructions may be executable by the processor to cause the apparatus to identify a communication link for traffic associated with a first latency type between a UE and a core network node via a radio access node, determine a first variable delay budget for communications of the first latency type between the radio access node and the core network node via the communication link, and transmit, to the radio access node, a delay budget configuration indicating the first variable delay budget and a second variable delay budget for communications of the first latency type between the UE and the core network node via the communication link.

Another apparatus for wireless communications is described. The apparatus may include means for identifying a communication link for traffic associated with a first latency type between a UE and a core network node via a radio access node, determining a first variable delay budget for communications of the first latency type between the radio access node and the core network node via the communication link, and transmitting, to the radio access node, a delay budget configuration indicating the first variable delay budget and a second variable delay budget for communications of the first latency type between the UE and the core network node via the communication link.

A non-transitory computer-readable medium storing code for wireless communications is described. The code may include instructions executable by a processor to identify a communication link for traffic associated with a first latency type between a UE and a core network node via a radio access node, determine a first variable delay budget for communications of the first latency type between the radio access node and the core network node via the communication link, and transmit, to the radio access node, a delay budget configuration indicating the first variable delay budget and a second variable delay budget for communications of the first latency type between the UE and the core network node via the communication link.

In some examples of the method, apparatuses, and non-transitory computer-readable medium described herein, the second variable delay budget may be for communications of the first latency type via the communication link between the UE and the radio access node.

In some examples of the method, apparatuses, and non-transitory computer-readable medium described herein, determining the first variable delay budget may include operations, features, means, or instructions for determining an uplink variable delay budget for uplink communications of the first latency type via the communication link and determining a downlink variable delay budget for downlink communications of the first latency type via the communication link.

In some examples of the method, apparatuses, and non-transitory computer-readable medium described herein, the uplink and downlink variable delay budgets may be different.

Some examples of the method, apparatuses, and non-transitory computer-readable medium described herein may further include operations, features, means, or instructions for determining a total delay budget between the UE and the core network node for communications of the first latency type via the communication link based on the delay budget configuration.

In some examples of the method, apparatuses, and non-transitory computer-readable medium described herein, determining the first variable delay budget may include operations, features, means, or instructions for determining, at a session management function (SMF), the first variable delay budget between the radio access node and the core network node for communications of the first latency type via the communication link.

Some examples of the method, apparatuses, and non-transitory computer-readable medium described herein may further include operations, features, means, or instructions for transmitting the delay budget configuration to a user plane function (UPF).

Some examples of the method, apparatuses, and non-transitory computer-readable medium described herein may further include operations, features, means, or instructions for receiving a request to establish or modify a quality of service (QoS) flow corresponding to the communication link, where the first variable delay budget may be determined in response to the request.

Some examples of the method, apparatuses, and non-transitory computer-readable medium described herein may further include operations, features, means, or instructions for receiving a request for handover of the UE, a packet data unit (PDU) session establishment of the UE, a PDU session modification of the UE, or any combination thereof, where the first variable delay budget may be determined in response to the request.

Some examples of the method, apparatuses, and non-transitory computer-readable medium described herein may further include operations, features, means, or instructions for identifying a set of RAN capabilities for the radio access node, where the first variable delay budget may be determined based on the set of RAN capabilities.

In some examples of the method, apparatuses, and non-transitory computer-readable medium described herein, the set of RAN capabilities includes a subcarrier spacing for communications via the radio access node, support for mini slot communications via the radio access node, a frame structure for communications via the radio access node, a bandwidth for communications via the radio access node, a bandwidth part for communications via the radio access node, or any combination thereof.

Some examples of the method, apparatuses, and non-transitory computer-readable medium described herein may further include operations, features, means, or instructions for identifying a set of system capabilities for communications between the UE and the core network node, where the first variable delay budget may be determined based on the set of system capabilities.

In some examples of the method, apparatuses, and non-transitory computer-readable medium described herein, the set of system capabilities includes a delay bound for traffic associated with the first latency type, a traffic class for traffic associated with the first latency type, or any combination thereof.

Some examples of the method, apparatuses, and non-transitory computer-readable medium described herein may further include operations, features, means, or instructions for determining configuration information of the UE, the radio access node, or the core network node, where the first variable delay budget may be determined based on the configuration information.

In some examples of the method, apparatuses, and non-transitory computer-readable medium described herein, the configuration information may be based on a time sensitive networking (TSN) procedure for determining a capability of a wireless communications system.

In some examples of the method, apparatuses, and non-transitory computer-readable medium described herein, the configuration information includes dynamic information from a TSN system associated with the UE or a TSN traffic class associated with a QoS flow corresponding to the communication link.

In some examples of the method, apparatuses, and non-transitory computer-readable medium described herein, the configuration information includes subscription information associated with the UE.

Some examples of the method, apparatuses, and non-transitory computer-readable medium described herein may further include operations, features, means, or instructions for transmitting the delay budget configuration based on a QoS associated with the UE, one or more QoS rules associated with the communication link, one or more uplink packet detection rules, one or more downlink packet detection rules, or any combination thereof.

In some examples of the method, apparatuses, and non-transitory computer-readable medium described herein, transmitting the delay budget configuration may include operations, features, means, or instructions for transmitting a first information element (IE) that indicates a total delay budget between the UE and the core network node for communications of the first latency type via the communication link and transmitting a second IE that indicates the first variable delay budget.

In some examples of the method, apparatuses, and non-transitory computer-readable medium described herein, the first variable delay budget may be indicated as a fraction of the second variable delay budget.

In some examples of the method, apparatuses, and non-transitory computer-readable medium described herein, the communication link corresponds to a QoS flow associated with the first latency type.

In some examples of the method, apparatuses, and non-transitory computer-readable medium described herein, the traffic associated with the first latency type includes TSN traffic.

A method of wireless communications is described. The method may include identifying a communication link for traffic associated with a first latency type between a UE and a core network node via a radio access node, receiving, from the core network node, a delay budget configuration indicating a first variable delay budget for communications of the first latency type between the radio access node and the core network node via the communication link and a second variable delay budget for communications of the first latency type between the UE and the core network node via the communication link, and scheduling a communication between the UE and the radio access node based on the first variable delay budget and the second variable delay budget.

An apparatus for wireless communications is described. The apparatus may include a processor, memory in electronic communication with the processor, and instructions stored in the memory. The instructions may be executable by the processor to cause the apparatus to identify a communication link for traffic associated with a first latency type between a UE and a core network node via a radio access node, receive, from the core network node, a delay budget configuration indicating a first variable delay budget for communications of the first latency type between the radio access node and the core network node via the communication link and a second variable delay budget for communications of the first latency type between the UE and the core network node via the communication link, and schedule a communication between the UE and the radio access node based on the first variable delay budget and the second variable delay budget.

Another apparatus for wireless communications is described. The apparatus may include means for identifying a communication link for traffic associated with a first latency type between a UE and a core network node via a radio access node, receiving, from the core network node, a delay budget configuration indicating a first variable delay budget for communications of the first latency type between the radio access node and the core network node via the communication link and a second variable delay budget for communications of the first latency type between the UE and the core network node via the communication link, and scheduling a communication between the UE and the radio access node based on the first variable delay budget and the second variable delay budget.

A non-transitory computer-readable medium storing code for wireless communications is described. The code may include instructions executable by a processor to identify a communication link for traffic associated with a first latency type between a UE and a core network node via a radio access node, receive, from the core network node, a delay budget configuration indicating a first variable delay budget for communications of the first latency type between the radio access node and the core network node via the communication link and a second variable delay budget for communications of the first latency type between the UE and the core network node via the communication link, and schedule a communication between the UE and the radio access node based on the first variable delay budget and the second variable delay budget.

In some examples of the method, apparatuses, and non-transitory computer-readable medium described herein, the second variable delay budget may be for communications of the first latency type via the communication link between the UE and the radio access node.

Some examples of the method, apparatuses, and non-transitory computer-readable medium described herein may further include operations, features, means, or instructions for identifying an uplink variable delay budget for uplink communications of the first latency type via the communication link based on the delay budget configuration and identifying a downlink variable delay budget for downlink communications of the first latency type via the communication link based on the delay budget configuration, where the communication between the UE and the radio access node may be scheduled based on the uplink variable delay budget or the downlink variable delay budget.

In some examples of the method, apparatuses, and non-transitory computer-readable medium described herein, the uplink and downlink variable delay budgets may be different.

Some examples of the method, apparatuses, and non-transitory computer-readable medium described herein may further include operations, features, means, or instructions for determining a total delay budget between the UE and the core network node for communications of the first latency type via the communication link based on the delay budget configuration, where the communication between the UE and the radio access node may be scheduled based on the total delay budget.

In some examples of the method, apparatuses, and non-transitory computer-readable medium described herein, receiving the delay budget configuration may include operations, features, means, or instructions for receiving a first IE that indicates a total delay budget between the UE and the core network node for communications of the first latency type via the communication link and receiving a second IE that indicates the first variable delay budget.

In some examples of the method, apparatuses, and non-transitory computer-readable medium described herein, the first variable delay budget may be indicated as a fraction of the second variable delay budget.

In some examples of the method, apparatuses, and non-transitory computer-readable medium described herein, the first variable delay budget may be based on a set of RAN capabilities for the radio access node.

In some examples of the method, apparatuses, and non-transitory computer-readable medium described herein, the first variable delay budget may be based on a set of system capabilities for communications between the UE and the core network node.

In some examples of the method, apparatuses, and non-transitory computer-readable medium described herein, the first variable delay budget may be determined based on configuration information of the UE, the radio access node, or the core network node, where the configuration information includes dynamic information from a TSN system associated with the UE, a TSN traffic class associated with a QoS flow corresponding to the communication link, subscription information associated with the UE, or any combination thereof.

In some examples of the method, apparatuses, and non-transitory computer-readable medium described herein, the communication link corresponds to a QoS flow associated with the first latency type.

In some examples of the method, apparatuses, and non-transitory computer-readable medium described herein, the traffic associated with the first latency type includes TSN traffic.

DETAILED DESCRIPTION

Figure 1:
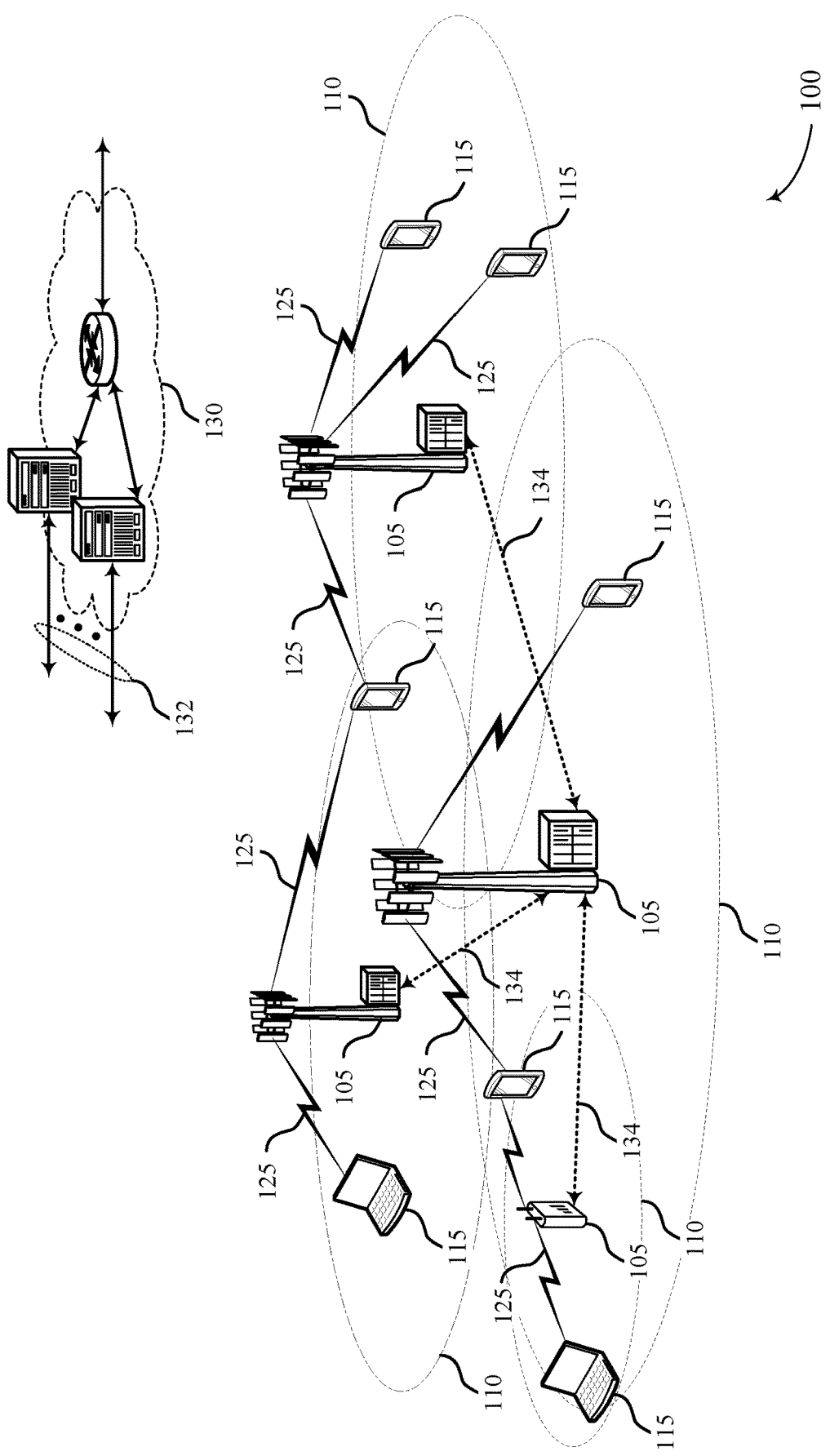
FIG. 1 illustrates an example of a wireless communications system that supports a delay budget for low latency communications in accordance with aspects of the present disclosure.

Some wireless communications systems may be used to facilitate communications in networks that rely on relatively strict timing synchronization of network components, sometimes referred to as time sensitive networking (TSN) systems. Such systems may be used to support, for example, factory automation. Some TSN systems specify relatively stringent quality of service (QoS) parameters, such as latency, jitter, and reliability standards for data traffic (e.g., less than 1 millisecond (ms) latency and $10^{-6}$ reliability). In some cases, such data traffic may be supported in a wireless communications system using a high reliability service, such as an ultra-reliable low latency communication (URLLC) service.

In the wireless communications system (e.g., carrying TSN communications), a QoS requirement for a particular QoS flow may define a target packet delay budget (PDB). The target PDB may set a target latency or total time delay for communications between a UE and a core network of the wireless communications system below which communicated data packets may be used. In the case of a downlink transmission, for example, the PDB may include a first delay component incurred between the core network and a radio access node (e.g., at a base station of the wireless communications system). The PDB may also include a second delay component incurred between the base station and the UE. Together, this total PDB of the first delay component and the second delay component may define a target latency from the core network to the UE via the base station. The PDB may similarly define a target latency from the UE to the core network via the base station in the case of uplink transmissions. If the total delay in communicating a data packet exceeds the total PDB, the data packet may not be used and may be ignored or discarded.

The base station may use the first component of the delay incurred between the core network and the base station to schedule uplink and downlink transmissions. In some wireless communications systems, the first component of the delay that is incurred between the core network and the base station may be configured to be a defined delay (e.g., 1 ms). In, for example, a wireless communications system carrying TSN communications, however, deployments are contemplated in which the core network and the base station are located in relatively close geographic proximity, and thus the first component of the delay may be substantially less than the defined delay (e.g., meaningfully less than the configured delay of 1 ms). This first delay component may vary based on, for example, capabilities of backhaul links with which the base station communicates with the core network, and based on one or more other capabilities (e.g., radio access network (RAN) capabilities), such as a subcarrier spacing for communications, support for mini-slot communications, a frame structure configuration, or a bandwidth or bandwidth part for communications via the base station. Thus, if the base station schedules communications with the UE based on the configured delay, scheduling decisions may be either overly aggressive or overly conservative, depending on the actual delay.

Accordingly, techniques are discussed herein that provide for signaling to the base station a PDB configuration that indicates a determined delay incurred between the core network and the base station, between the UE and the base station, or between the core network and the UE. For example, the core network may transmit to the base station the PDB configuration indicating a combination of the delay between the core network and the base station, the delay between the base station and the UE 115, and the total delay between the UE and the core network. Based on the PDB configuration determining an estimate of the actual delay in such communications of the wireless communications system, the base station (or another device) may relatively more accurately schedule communications between the UE, base station, and core network.

In some cases, the core network may determine the PDB configuration at an adapter function supported by the system, for example, the session management function (SMF). The core network may determine the PDB configuration, for example, when the core network entity receives a request to establish or modify the QoS flow. The core network may also transmit the PDB configuration via adapter function supported by the system. For example, the core network may transmit the PDB configuration to the base station via the SMF In some cases, the core network may determine the PDB configuration based on configured capability information associated with the wireless communications system. For example, the core network may determine the PDB configuration based on RAN capabilities, such as a subcarrier spacing to be used for communications, support for minislot communications, a frame structure configuration, a radio frequency spectrum bandwidth, a bandwidth part, and the like. Additionally or alternatively, the core network may determine the PDB configuration based on a capability of the backhaul communication links (e.g., ethernet links) to be used to communicate with the base station. Additionally or alternatively, the core network may determine the PDB configuration based on capabilities of the wireless communications system, for example, a delay bound associated with the transport of communications within the wireless communications system, which may be configured based on, for example, a traffic class (e.g., a QoS class).

Aspects of the disclosure are initially described in the context of wireless communications systems and a process flow. Aspects of the disclosure are further illustrated by and described with reference to apparatus diagrams, system diagrams, and flowcharts that relate to delay budget for low latency communications.

FIG. 1 illustrates an example of a wireless communications system 100 that supports a delay budget for low latency communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 ms, where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples, (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems (e.g., the wireless communications system 100) may be used to facilitate communications in networks that rely on relatively strict timing synchronization of network components, sometimes referred to as TSN systems. Such systems may be used to support, for example, factory automation. Some TSN systems specify relatively stringent QoS parameters, such as, jitter, reliability targets (e.g., packet error loss), or delay targets (e.g., PDBs, latency targets, etc.) for data traffic. For example, a TSN system may have targets such as a latency of less than 1 ms and a packet error rate less than $10^{-6}$. In some cases, such data traffic may be supported in a wireless communications system using a high reliability service, such as a URLLC service.

In the wireless communications system 100 (e.g., carrying TSN communications), a QoS standard for a particular QoS flow may define a target PDB. The target PDB may set a target latency or total time delay for communications between a UE 115 and the core network 130 of the wireless communications system 100 below which communicated data packets may be used. In the case of a downlink transmission, the PDB may include a first delay component incurred between the core network 130 (e.g., from a user plane function (UPF), SMF, or other adapter function) and a radio access node (at, e.g., a base station 105). The PDB may also include a second delay component incurred between the base station 105 and the UE 115. Together, this total PDB defines a target latency from the UPF to the UE 115 via the base station 105. The PDB may similarly define a target latency from the UE 115 to the UPF or SMF via the base station 105 in the case of an uplink transmission. If the total delay in communicating a data packet exceeds the total PDB defined by the PDB configuration, the data packet may not be used and may be ignored.

The base station 105 may use the first component of the delay incurred between the core network 130 and the base station 105 to schedule uplink and downlink communications, for example, with the UE 115. In some wireless communications systems, the first component of the delay that is incurred between the core network 130 and the base station 105 may be assumed to be a defined delay (e.g., 1 ms), for example, based on a delay configuration. However, in the wireless communications system 100 (e.g., being a TSN system), deployments are contemplated in which the core network 130 and the base station 105 are located in relatively close geographic proximity, and thus the first component of the delay may be substantially less than the defined delay (e.g., meaningfully less than the assumed delay of 1 ms per the delay configuration). This first delay component may also vary based on, for example, particular capabilities of the backhaul links 132 or other RAN capabilities, such as a subcarrier spacing for communications, support for mini-slot communications, a frame structure configuration, or a bandwidth or bandwidth part for communications via the base station 105. Thus, if the base station 105 schedules communications with the UE 115 based on the defined delay, scheduling decisions may be either overly aggressive or overly conservative, depending on the actual delay.

Techniques are discussed herein that provide for signaling to the base station 105 a PDB configuration that indicates a determined delay incurred between any of the core network 130, the UE 115, and the base station 105. For example, the core network 130 may transmit to the base station 105 the PDB configuration indicating a combination of the first delay component (e.g., delay between the core network 130 and the base station 105), the second delay component (e.g., delay between the base station 105 and the UE 115), or the total delay (e.g., between the UE 115 and the core network 130). Based on the indication of the actual delay in the PDB configuration, the base station 105 relatively more accurately schedule communications between the UE 115, the base station 105, and the core network 130.

Figure 2:
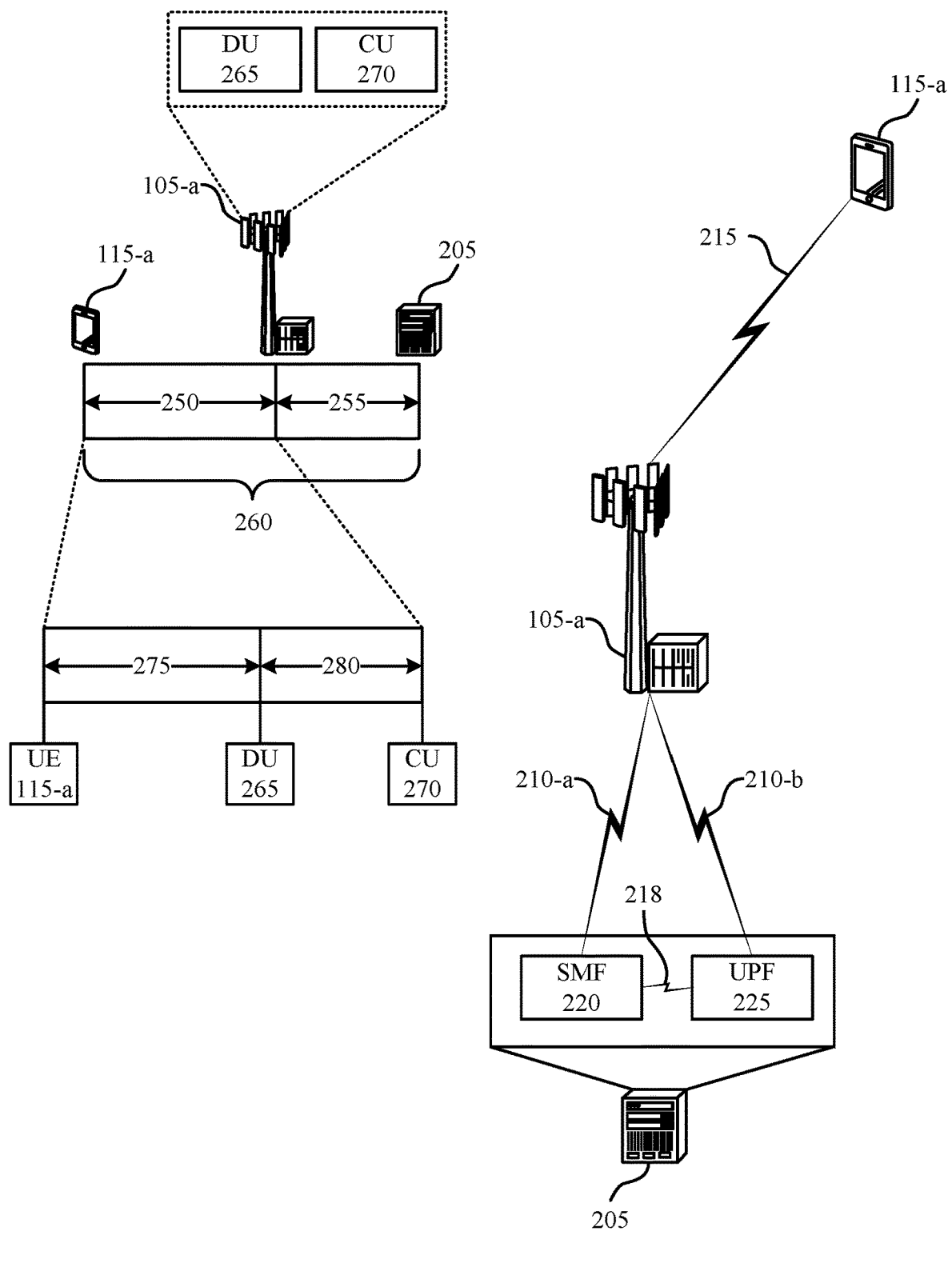
FIG. 2 illustrates an example of a wireless communications system that supports a delay budget for low latency communications in accordance with aspects of the present disclosure.

FIG. 2 illustrates an example of a wireless communications system 200 that supports a delay budget for low latency communications in accordance with aspects of the present disclosure. In some examples, the wireless communications system 200 may implement aspects of wireless communications system 100. The wireless communications system 200 may include a UE 115-a, which may be an example of a UE 115 as described with reference to FIG. 1. The wireless communications system 200 may include a radio access node at a base station 105-a, which may each be an example of a base station 105 as described with reference to FIG. 1. The wireless communications system 200 may include a core network entity 205 (e.g., an EPC, a next generation core (NGC), a fifth generation core (5GC) and the like), which may be an example of an entity of the core network 130 as described with reference to FIG. 1. It is to be understood that references to specific radio access technologies (RATs) (e.g., LTE or NR) in the below figures are provided for illustrative purposes and different RATs not specifically referred to herein may be used interchangeably with those described herein.

The base station 105-a may communicate with the core network entity 205 using one or more communication links 210 and the base station 105-a may communicate with the UE 115-a using a communication link 215. In some cases, the core network entity 205 may include an SMF 220, a UPF 225, an access and mobility function (AMF), or a control plane function (CPF). In some cases, the SMF 220 may provide session management services for UE 115-a. The SMF 220 may communicate with different nodes in the wireless communications system 200 to signal to the nodes, for example, different QoS procedures to be performed for different QoS standards. In some cases, the UPF 225 may handle user information such as PDCP, RLC, MAC, and PHY communications. In some cases, the SMF 220 and the UPF 225 may be communicatively coupled in the core network entity 205 via communication link 218. While the SMF 220 and the UPF 225 are shown in FIG. 2 as communicatively coupled in the core network entity 205, the SMF 220 and the UPF 225 may alternately be located at separate nodes in the wireless communications system 200.

The core network entity 205 may signal to the base station 105-a, for a particular QoS flow, a PDB configuration indicating a delay between the devices of the wireless communications system 200. FIG. 2 also illustrates an example PDB timeline illustrating example delays incurred between the core network entity 205, the base station 105-a, and the UE 115-a. For example, the core network entity 205 may transmit to the base station 105-a (e.g., using the communication link 210-a) the PDB configuration that indicates a combination of a first delay component 250 (e.g., delay between the core network entity 205 and the base station 105-a), a second delay component 255 (e.g., delay between the base station 105-a and the UE 115-a), and the total PDB 260. The PDB configuration may include an IE including one or more fields or subfields for indicating one or more of the first delay component 250, the second delay component 255, and the total PDB 260. In some cases, the PDB configuration may indicate delays that are the same for uplink versus downlink transmissions. Alternatively, the PDB configuration may indicate delays that are different for uplink versus downlink transmissions. Based on the indications of the delay or delays in the PDB configuration, the base station 105-a may schedule communications between the UE 115-a and the base station 105-a. In some cases, scheduling based on the indications of delays may allow network resources to be used more efficiently, among other benefits, relative to scheduling without indications of delays.

In different cases, different of ones of these three parameters may be signaled to the base station 105-a in the PDB configuration. For example, given that the sum of the first delay component 250 and the second delay component 255 equals the total PDB 260, the core network entity 205 may signal any two of the first delay component 250, the second delay component 255, and the total PDB 260. By signaling two parameters of the three, the third parameter can be calculated by either adding or subtracting the delay components with respect to the total PDB 260. Thus, in some cases, any two of the of the three parameters may be included in the PDB configuration. Alternatively, the PDB configuration may signal all three of the parameters in the PDB configuration.

According to some aspects, the base station 105-a may be a node of the RAN and may include multiple units or functions such as a distributed unit (DU) 265 and a central unit (CU) 270. In other cases, one or more of the DU 265 and the CU 270 may be separate from the base station 105-a and may be individual entities associated with the RAN. The DU 265 and CU 270 may, in some cases, be in communication with one another (e.g., via base station 105-a, within base station 105-a, or separate from base station 105-a (via separate communication links)). In some examples, CU 270 may perform operations similar to those of the core network entity 205 and the DU 265 may perform operations similar to a node of the RAN (e.g., base station 105-a).

In some examples, the total PDB 260 may also include delay components between the DU 265 and the CU 270. For instance, the first delay component 250 (e.g., between the base station 105-a or RAN and the UE 115-a) may be divided (e.g., evenly or unevenly) between the DU 265 and the CU 270. The PDB configuration may indicate the division of the first delay component 250 into a third delay component 275 between the UE 115-a and the DU 265 and fourth delay component 280 between the DU 265 and the CU 270. The PDB configuration may indicate at least some if not each of the four components separately (e.g., via separate fields in the signaling of the PDB configuration) or may indicate at least some (e.g., a subset) if not each of the four components additionally or alternatively with a total PDB 260. The signaling may include information as to how the total PDB 260 is to be divided between the core network entity 205, the base station 105-a, the DU 265, the CU 270, and the UE 115-a. In some aspects, the third delay component 275 and the fourth delay component 280 may be different for uplink versus downlink transmissions.

In some cases, the third delay component 275 and the fourth delay component 280 may be balanced (e.g., the same) or may be different, as shown. For example, the PDB configuration may indicate a balanced delay budget (e.g., an even split delay budget) between the DU 265, the CU 270, and the UE 115-a. In such instances, the PDB configuration may indicate a division of the first delay component 250 (e.g., between base station 105-a of the RAN and the UE 115-a) into respective delay budgets for each of the CU 270 to DU 265 and DU 265 to UE 115-a (e.g., the third delay component 275 and the fourth delay component 280). In other examples, delay budgets between the RAN and the UE 115-a may be unbalanced (e.g., unevenly split) between the DU 265, the CU 270, and the UE 115-a or may be defined separately from the first delay component 250.

The core network entity 205 may determine the PDB configuration at the SMF 220. The core network entity 205 may determine the PDB configuration, for example, when the core network entity 205 receives a request to establish the QoS flow or a request to modify the QoS flow. Additionally or alternatively, the core network entity 205 may determine the PDB configuration, for example, when the core network entity 205 receives a request to perform a handover to the UE 115-a, a request to establish a PDU session with the UE 115-a, or a request to modify a PDU session with the UE 115-a.

The core network entity 205 may transmit the PDB configuration via an adapter function supported by the system. For example, the core network entity 205 may transmit the PDB configuration via the base station 105-a via the SMF 220 using the communication link 210-a. Additionally or alternatively, the core network entity 205 may transmit the PDB configuration via one or more other adapter functions, including, for example, one or more PCFs, one or more additional SMFs, one or more AMFs, one or more UPFs, and the like. Additionally or alternatively, the core network entity 205 may also transmit the PDB configuration to the UE 115-a, for example, using one or more AMFs. Further additionally or alternatively, the core network entity 205 may transmit the PDB configuration to the UPF 225, for example, via the communication link 218. The UPF 225 may use the PDB configuration, for example, for receiving uplink transmission from the UE 115-*a* using the communication link 210-*b* via the base station 105-*a*.

In some cases, the core network entity 205 may determine the PDB configuration based on configured capability information associated with the wireless communications system 200. For example, the core network entity 205 may determine the PDB configuration based on RAN capabilities, such as a subcarrier spacing to be used for communications, support for mini-slot communications, a frame structure configuration, a radio frequency spectrum bandwidth, a bandwidth part, and the like. For example, the second delay component 255 may be determined to be relatively shorter for a subcarrier spacing (e.g., of 60 kilohertz (kHz)) with shorter slots relative to another subcarrier spacing (e.g., of 30 kHz). Additionally or alternatively, the core network entity 205 may determine the PDB configuration based on a capability of the communication links 210 (e.g., ethernet links) to be used to communicate with the nodes of the wireless communications system 200 (e.g., a bandwidth of backhaul links between the core network entity 205 and the base station 105-*a*). For example, the second delay component 255 may be determined to be relatively longer for an ethernet link of the core network entity 205 that has a greater bandwidth (of, e.g., 10 gigabits per second (Gbps)) than a another ethernet link of the core network entity 205 with a lower bandwidth (e.g., of 1 Gbps). Additionally or alternatively, the core network entity 205 may determine the PDB configuration based on capabilities of the wireless communications system 200, for example, a delay bound associated with the transport of communications within the wireless communications system 200, which may be configured based on a traffic class (e.g., a QoS class). For example, for a first QoS class, the second delay component 255 may be 0.5 ms and for a second QoS class, the second delay component 255 may be 0.3 ms. The core network entity 205 may correlate different traffic classes to different PDB configurations, for example, using a lookup table and the like. In some cases, the core network entity 205 may additionally or alternatively determine the PDB configuration based on subscription information associated with the UE 115 (e.g., a type of the UE 115 and the services for which the UE 115 is subscribed).

In some cases, the core network entity 205 may determine the PDB configuration dynamically. For example, the core network entity 205 may recalibrate the PDB configuration based on, for example, varying link conditions. In this case, the core network entity 205 may perform procedures over the communication links 210 to determine the PDB configuration based on current (e.g., instantaneous or substantially instantaneous) characteristics or capabilities of the wireless communications system 200. For example, the first delay component 250 may be determined to be relatively longer for a first QoS flow relative to a second QoS flow if the core network entity 205 dynamically determines that a greater amount of backhaul resources are available for the first QoS flow than the second QoS flow, as the latency between the base station 105-*a* and the core network entity 205 may be relatively higher in this case.

In some cases, the core network entity 205 may transmit the PDB configuration in a message including one or more fields including the parameters for the PDB configuration. For example, the core network entity 205 may transmit the PDB configuration using a QoS profile, one or more QoS rules, one or more uplink packet detection rules, or one or more downlink packet detection rules. The PDB configuration may be indicated in one or more fields or subfields of an IE (e.g., a PDB information element (IE)). For example, the IE may include one or more fields or subfields that indicate a parameter representing the first delay component 250, a parameter representing the second delay component 255, or a parameter representing the total PDB 260. The delay budget parameters may be indicated in terms of lengths of time, for example, nanoseconds or milliseconds. Additionally or alternatively, the delay budget parameters of the first delay component 250 or the second delay component 255 may be indicated as a fraction of the total PDB 260.

Figure 3:
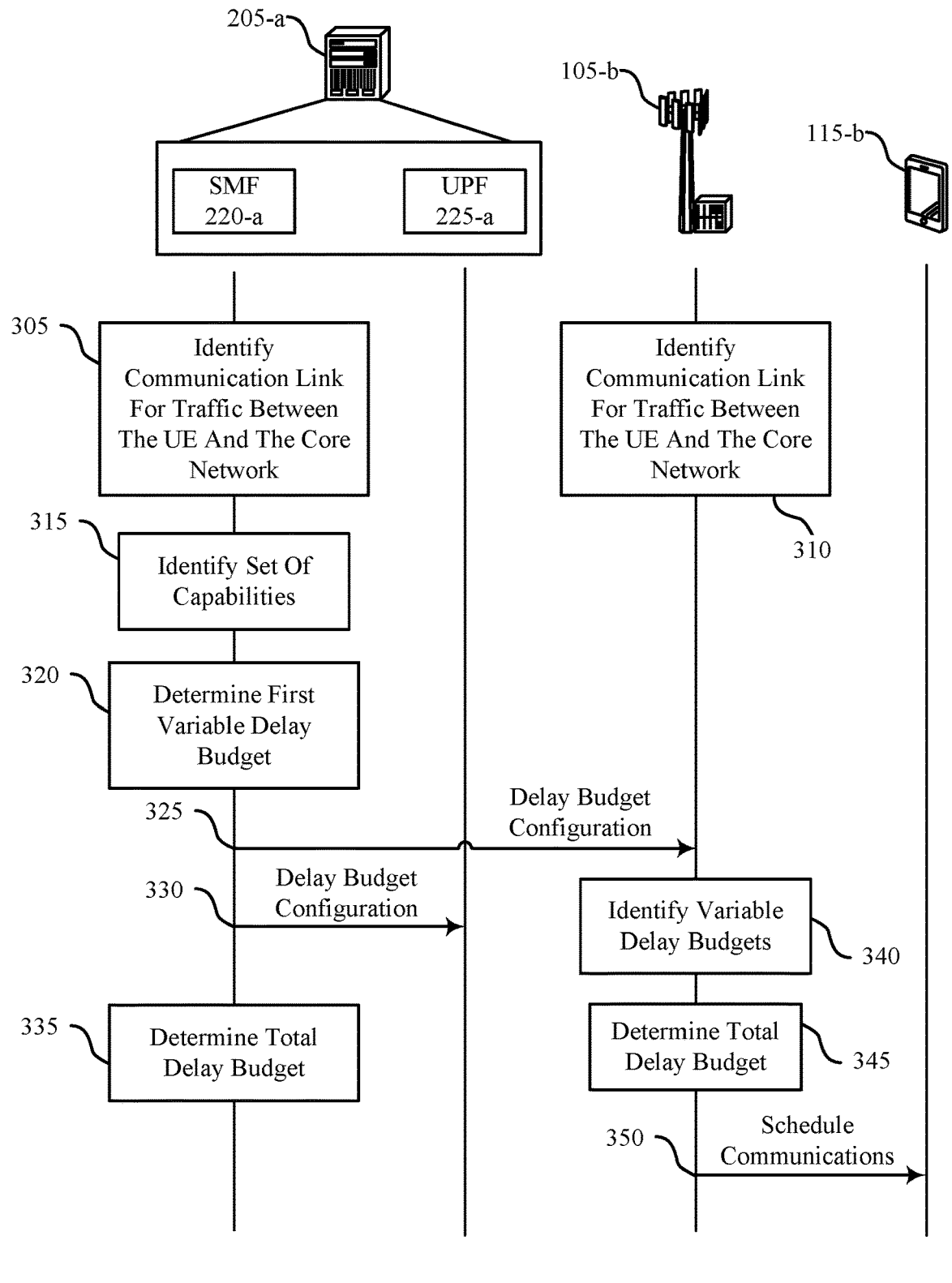
FIG. 3 illustrates an example of a process flow that supports a delay budget for low latency communications in accordance with aspects of the present disclosure.

FIG. 3 illustrates an example of a process flow 300 that supports a delay budget for low latency communications in accordance with aspects of the present disclosure. In some examples, the process flow 300 may implement aspects of the wireless communications systems 100 and 200. For example, the process flow 300 includes a UE 115-*b*, a base station 105-*b*, and a core network entity 205-*a* that each may be examples of the corresponding devices described with reference to FIGS. 1 and 2. The core network entity 205-*a* may include an SMF 220-*a* and a UPF 225-*a*, but it should be understood that the SMF 220-*a* and the UPF 225-*a* are provided for illustrative purposes only. Different RATs, devices, nodes, functions, and the like may perform similar functions. The process flow 300 may illustrate an example of the core network entity 205-*a* determining and signaling to the base station 105-*b* a PDB configuration indicating a delay budget (e.g., a PDB, as described with reference to FIGS. 2 and 3) to be used for communications between the UE 115-*b* and the core network entity 205-*a*.

At 305, the SMF 220-*a* may identify a communication link for traffic associated with a first latency type between the UE 115-*b* and a core network node (e.g., at the core network entity 205-*a*) via the base station 105-*b*. In some cases, the communication link may correspond to a QoS flow associated with the first latency type. In some cases, the traffic associated with the first latency type may include TSN traffic. At 310, the base station 105-*b* may identify the communication link for traffic associated with the first latency type between the UE 115-*b* and the core network entity 205-*a* via the base station 105-*b*.

At 315, the SMF 220-*a* may identify one or more sets of capabilities based on which the SMF 220-*a* may determine one or more delay budgets at 320. For example, the SMF 220-*a* may identify a set of RAN capabilities for the base station 105-*b*. In some cases, the set of RAN capabilities may include a subcarrier spacing for communications via the base station 105-*b*, support for mini slot communications via the base station 105-*b*, a frame structure for communications via the base station 105-*b*, a bandwidth for communications via the base station 105-*b*, a bandwidth part for communications via the base station 105-*b*, or any combination. Additionally or alternatively, the SMF 220-*a* may identify a set of system capabilities for communications between the UE 115-*b* and the core network entity 205-*a*. In some cases, the set of system capabilities may include a delay bound for traffic associated with the first latency type, a traffic class for traffic associated with the first latency type, or any combination. Additionally or alternatively, the SMF 220-*a* may determine configuration information of the UE 115-*b*, the base station 105-*b*, or the core network entity 205-*a*. In some cases, the configuration information may be based on a TSN procedure for determining a capability of a wireless communications system. In some cases, the configuration information may include dynamic information from a TSN system associated with the UE 115-*b* or a TSN traffic class associated with a QoS flow corresponding to the communication link. In some cases, the configuration information may include subscription information associated with the UE 115-b.

At 320, the SMF 220-a may determine a first variable delay budget for communications of the first latency type between the base station 105-b and the core network entity 205-a via the communication link (e.g., a first delay component incurred between the core network entity 205-a and the base station 105-b, as described with reference to FIGS. 1 and 2). In some cases, determining the first variable delay budget may include determining an uplink variable delay budget for uplink communications of the first latency type via the communication link. Determining the first variable delay budget may further include determining a downlink variable delay budget for downlink communications of the first latency type via the communication link. In some cases, the first variable delay budget may be determined based on the set of RAN capabilities as may have been identified at 315. In some cases, the first variable delay budget may be determined based on the set of system capabilities as may have been identified at 315. In some cases, the first variable delay budget may be determined based on the configuration information as may have been determined at 315. In some cases, the SMF 220-a may receive request to establish or modify a QoS flow corresponding to the communication link, where the first variable delay budget may be determined in response to the request. In some cases, the SMF 220-a may receive a request for handover of the UE 115-b, a PDU session establishment of the UE 115-b, a PDU session modification of the UE 115-b, or any combination thereof, where the first variable delay budget may be determined in response to the request.

At 325, the SMF 220-a may transmit to the base station 105-b, and the base station 105-b may receive from the SMF 220-a, a delay budget configuration indicating the first variable delay budget and a second variable delay budget for communications of the first latency type between the UE 115-b and the core network entity 205-a via the communication link. In some cases, the second variable delay budget may additionally or alternatively be for communications of the first latency type via the communication link between the UE 115-b and the base station 105-b. In some cases, the SMF 220-a may transmit the delay budget configuration based on a QoS associated with 115-b the UE, one or more QoS rules associated with the communication link, one or more uplink packet detection rules, one or more downlink packet detection rules, or any combination. In some cases, transmitting the delay budget configuration may include transmitting a first IE that indicates a total delay budget between the UE 115-b and the core network entity 205-a for communications of the first latency type via the communication link. In some cases, transmitting the delay budget configuration may include transmitting a second IE that indicates the first variable delay budget. In some cases, the first variable delay budget may be indicated as a fraction of the second variable delay budget.

At 330, the SMF 220-a may transmit to the UPF 225-a, and the UPF 225-a may receive from the SMF 220-a, the delay budget configuration. The UPF 225 may use the delay budget configuration, for example, for receiving uplink transmission from the UE 115-b using the communication link. At 335, the SMF 220-a may determine the total delay budget between the UE 115-b and the core network entity 205-a for communications of the first latency type via the communication link based on the delay budget configuration At 340, the base station 105-b may identify one or more variable delay budgets. For example, the base station 105-b may identify an uplink variable delay budget for uplink communications of the first latency type via the communication link based on the delay budget configuration, as may have been received at 325. In some cases, the base station 105-b may further identify a downlink variable delay budget for downlink communications of the first latency type via the communication link based on the delay budget configuration. In some cases, the uplink and downlink variable delay budgets may be different.

At 345, the base station 105-b may determine the total delay budget between the UE 115-a and the core network entity 205-a for communications of the first latency type via the communication link based on the delay budget configuration.

At 350, the base station 105-b may schedule a communication between the UE 115-b and the base station 105-b based on the first variable delay budget and the second variable delay budget. For example, the base station 105-b may transmit to the UE 115-b, and the UE 115-b may receive from the base station 105-b, one or more scheduling messages to indicate, for example, time and frequency resources with which to communicate. In some cases, the communication between the UE 115-b and the base station 105-b may be scheduled based on the total delay budget. In some cases, the communication between the UE 115-b and the base station 105-b may be scheduled based on the uplink variable delay budget or the downlink variable delay budget, as may have been identified at 340.

Figure 4:
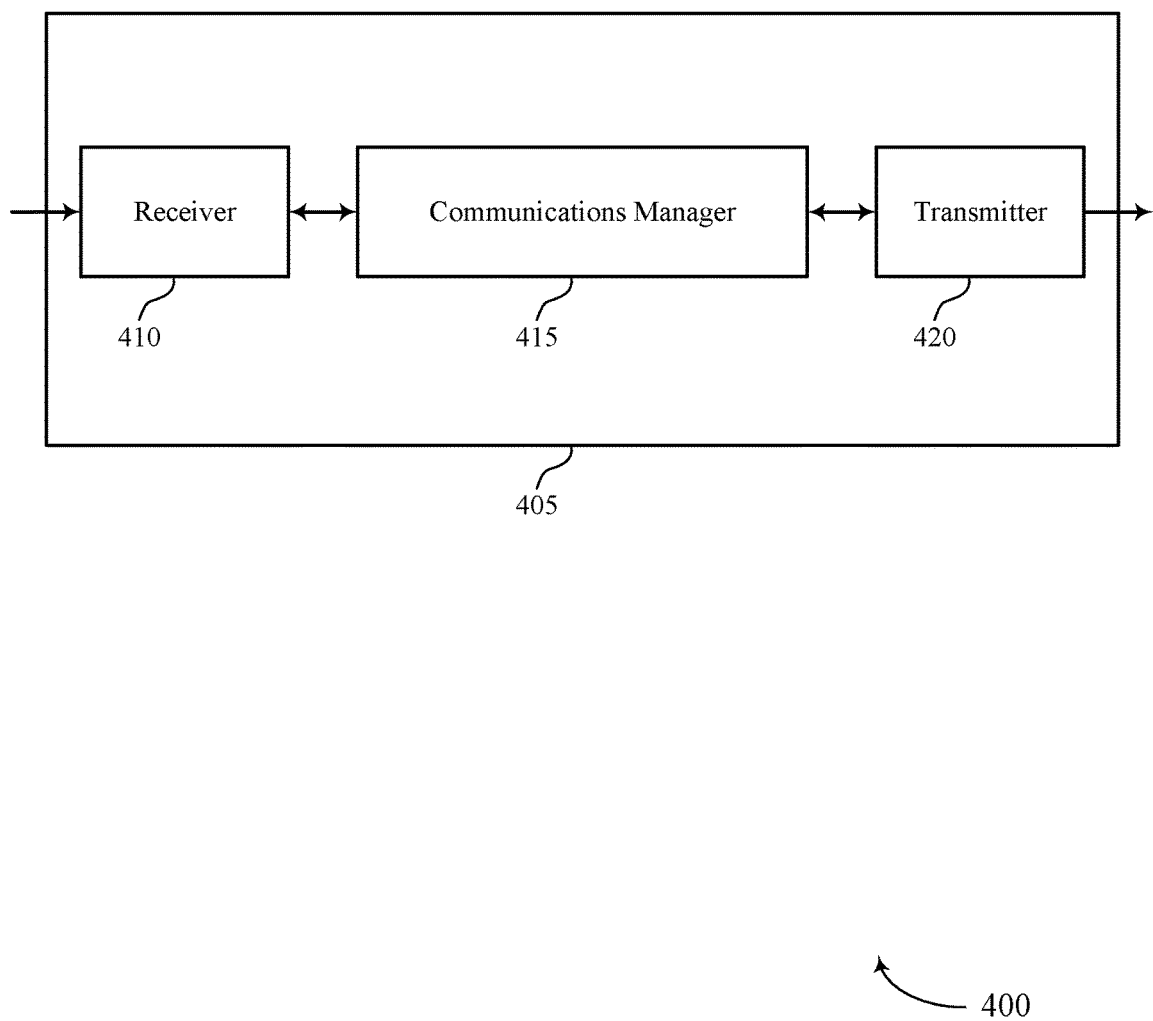
FIGS. 4 and 5 show block diagrams of devices that support a delay budget for low latency communications in accordance with aspects of the present disclosure.

FIG. 4 shows a block diagram 400 of a device 405 that supports a delay budget for low latency communications in accordance with aspects of the present disclosure. The device 405 may be an example of aspects of a base station 105 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to delay budget for low latency communications, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a communication link for traffic associated with a first latency type between a UE and a core network node via a radio access node. The communications manager 415 also may receive, from the core network node, a delay budget configuration indicating a first variable delay budget for communications of the first latency type between the radio access node and the core network node via the communication link and a second variable delay budget for communications of the first latency type between the UE and the core network node via the communication link. The communications manager 415 may further schedule a communication between the UE and the radio access node based on the first variable delay budget and the second variable delay budget. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its subcomponents may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
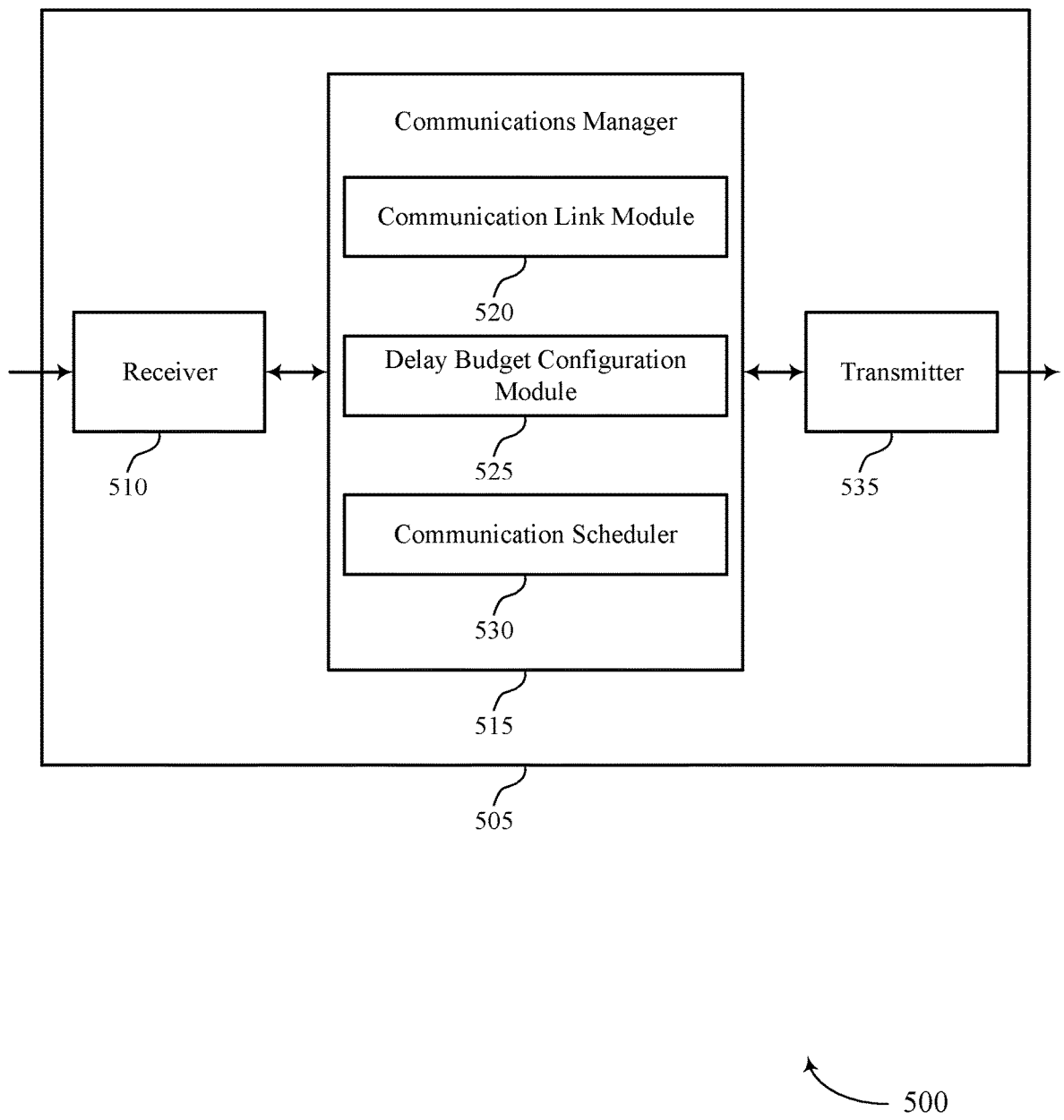

FIG. 5 shows a block diagram 500 of a device 505 that supports a delay budget for low latency communications in accordance with aspects of the present disclosure. The device 505 may be an example of aspects of a device 405, or a base station 105 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to delay budget for low latency communications, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a communication link module 520, a delay budget configuration module 525, and a communication scheduler 530. The communications manager 515 may be an example of aspects of the communications manager 710 described herein.

The communication link module 520 may identify a communication link for traffic associated with a first latency type between a UE and a core network node via a radio access node.

The delay budget configuration module 525 may receive, from the core network node, a delay budget configuration indicating a first variable delay budget for communications of the first latency type between the radio access node and the core network node via the communication link and a second variable delay budget for communications of the first latency type between the UE and the core network node via the communication link.

The communication scheduler 530 may schedule a communication between the UE and the radio access node based on the first variable delay budget and the second variable delay budget.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
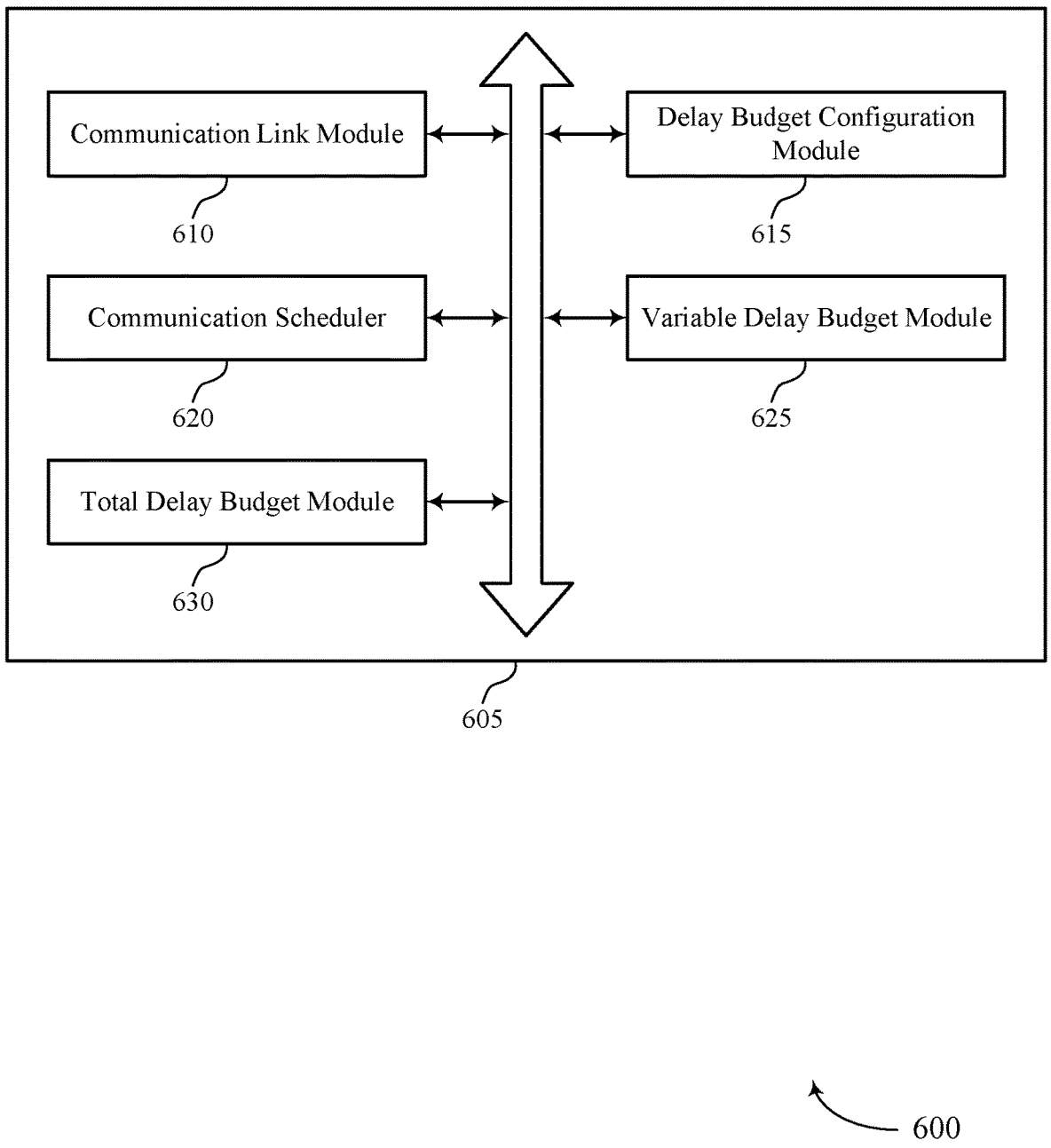
FIG. 6 shows a block diagram of a communications manager that supports a delay budget for low latency communications in accordance with aspects of the present disclosure.

FIG. 6 shows a block diagram 600 of a communications manager 605 that supports a delay budget for low latency communications in accordance with aspects of the present disclosure. The communications manager 605 may be an example of aspects of a communications manager 415, a communications manager 515, or a communications manager 710 described herein. The communications manager 605 may include a communication link module 610, a delay budget configuration module 615, a communication scheduler 620, a variable delay budget module 625, and a total delay budget module 630. Each of these modules may communicate, directly or indirectly, with one another (e.g., via one or more buses).

The communication link module 610 may identify a communication link for traffic associated with a first latency type between a UE and a core network node via a radio access node. In some cases, the communication link corresponds to a QoS flow associated with the first latency type. In some cases, the traffic associated with the first latency type includes TSN traffic.

The delay budget configuration module 615 may receive, from the core network node, a delay budget configuration indicating a first variable delay budget for communications of the first latency type between the radio access node and the core network node via the communication link and a second variable delay budget for communications of the first latency type between the UE and the core network node via the communication link.

In some examples, the delay budget configuration module 615 may receive a first IE that indicates a total delay budget between the UE and the core network node for communications of the first latency type via the communication link. In some cases, the second variable delay budget is for communications of the first latency type via the communication link between the UE and the radio access node.

The communication scheduler 620 may schedule a communication between the UE and the radio access node based on the first variable delay budget and the second variable delay budget. The variable delay budget module 625 may identify an uplink variable delay budget for uplink communications of the first latency type via the communication link based on the delay budget configuration.

In some examples, the variable delay budget module 625 may identify a downlink variable delay budget for downlink communications of the first latency type via the communication link based on the delay budget configuration, where the communication between the UE and the radio access node is scheduled based on the uplink variable delay budget or the downlink variable delay budget.

In some examples, the variable delay budget module 625 may receive a second IE that indicates the first variable delay budget. In some cases, the uplink and downlink variable delay budgets are different. In some cases, the first variable delay budget is indicated as a fraction of the second variable delay budget. In some cases, the first variable delay budget is based on a set of RAN capabilities for the radio access node. In some cases, the first variable delay budget is based on a set of system capabilities for communications between the UE and the core network node.

In some cases, the first variable delay budget is determined based on configuration information of the UE, the radio access node, or the core network node, where the configuration information includes dynamic information from a TSN system associated with the UE, a TSN traffic class associated with a QoS flow corresponding to the communication link, subscription information associated with the UE, or any combination thereof.

The total delay budget module 630 may determine a total delay budget between the UE and the core network node for communications of the first latency type via the communication link based on the delay budget configuration, where the communication between the UE and the radio access node is scheduled based on the total delay budget.

Figure 7:
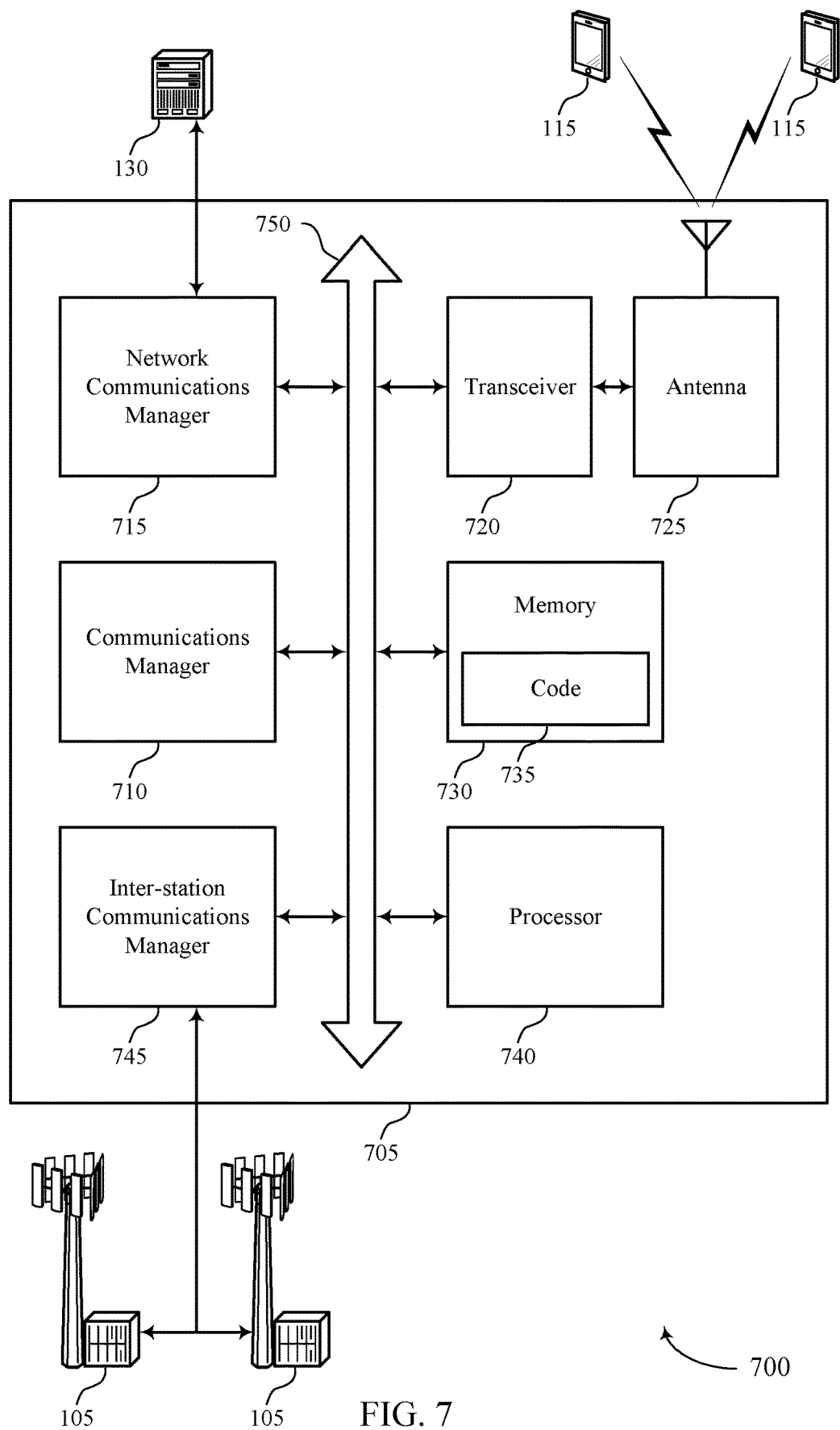
FIG. 7 shows a diagram of a system including a device that supports a delay budget for low latency communications in accordance with aspects of the present disclosure.

FIG. 7 shows a diagram of a system 700 including a device 705 that supports a delay budget for low latency communications in accordance with aspects of the present disclosure. The device 705 may be an example of or include the components of device 405, device 505, or a base station 105 as described herein. The device 705 may include components for bi-directional voice and data communications including components for transmitting and receiving communications, including a communications manager 710, a network communications manager 715, a transceiver 720, an antenna 725, memory 730, a processor 740, and an inter-station communications manager 745. These components may be in electronic communication via one or more buses (e.g., bus 750).

The communications manager 710 may identify a communication link for traffic associated with a first latency type between a UE and a core network node via a radio access node, receive, from the core network node, a delay budget configuration indicating a first variable delay budget for communications of the first latency type between the radio access node and the core network node via the communication link and a second variable delay budget for communications of the first latency type between the UE and the core network node via the communication link, and schedule a communication between the UE and the radio access node based on the first variable delay budget and the second variable delay budget.

The network communications manager 715 may manage communications with the core network (e.g., via one or more wired backhaul links). For example, the network communications manager 715 may manage the transfer of data communications for client devices, such as one or more UEs 115.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random access memory (RAM), read only memory (ROM), or a combination thereof. The memory 730 may store computer-readable code 735 including instructions that, when executed by a processor (e.g., the processor 740) cause the device to perform various functions described herein. In some cases, the memory 730 may contain, among other things, a Basic I/O System (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In some cases, a memory controller may be integrated into processor 740. The processor 740 may be configured to execute computer-readable instructions stored in a memory (e.g., the memory 730) to cause the device 705 to perform various functions (e.g., functions or tasks supporting delay budget for low latency communications).

The inter-station communications manager 745 may manage communications with other base station 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communication network technology to provide communication between base stations 105.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
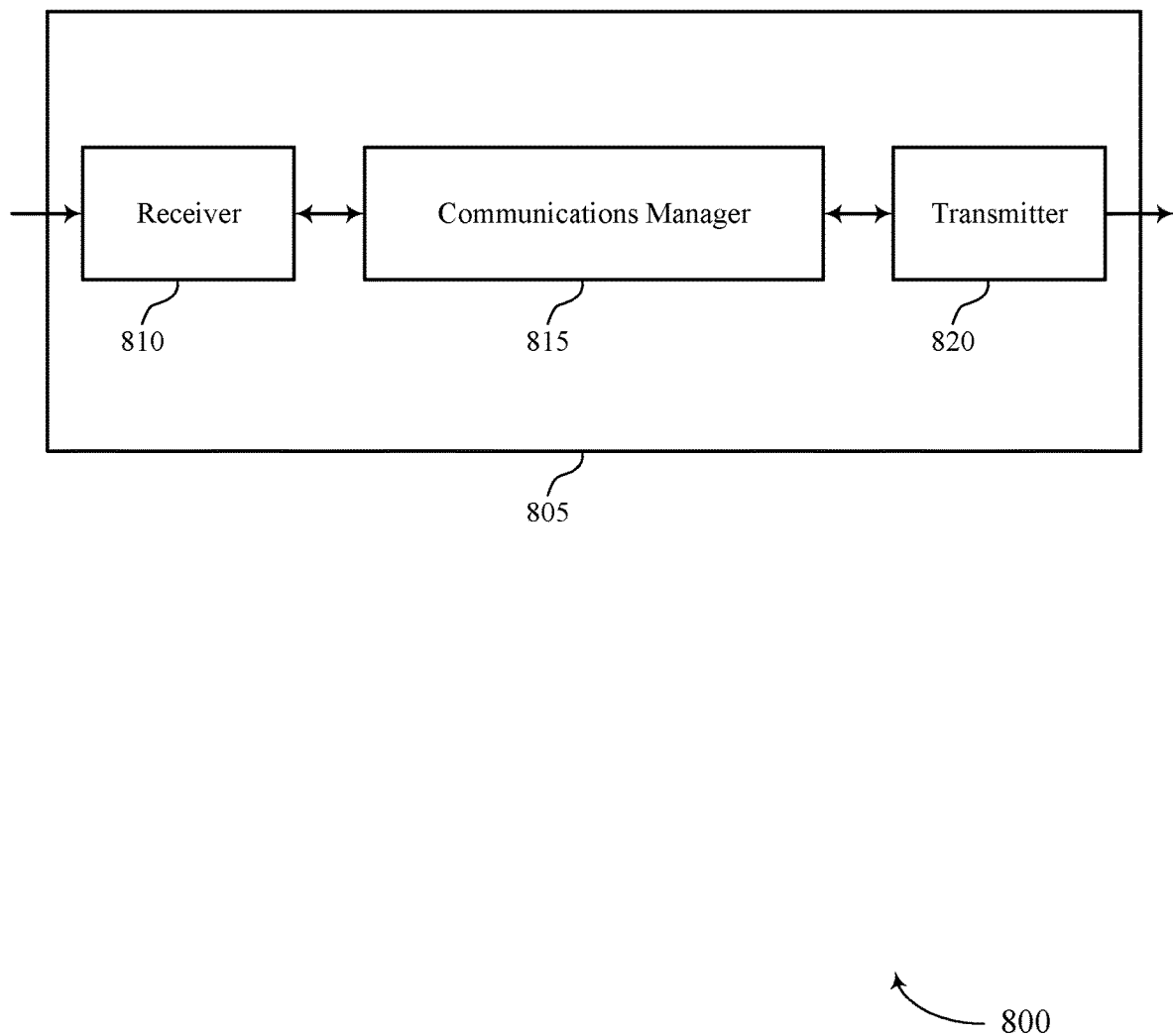
FIGS. 8 and 9 show block diagrams of devices that support a delay budget for low latency communications in accordance with aspects of the present disclosure.

FIG. 8 shows a block diagram 800 of a device 805 that supports a delay budget for low latency communications in accordance with aspects of the present disclosure. The device 805 may be an example of aspects of a network entity as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to delay budget for low latency communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a communication link for traffic associated with a first latency type between a UE and a core network node via a radio access node, determine a first variable delay budget for communications of the first latency type between the radio access node and the core network node via the communication link, and transmit, to the radio access node, a delay budget configuration indicating the first variable delay budget and a second variable delay budget for communications of the first latency type between the UE and the core network node via the communication link. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
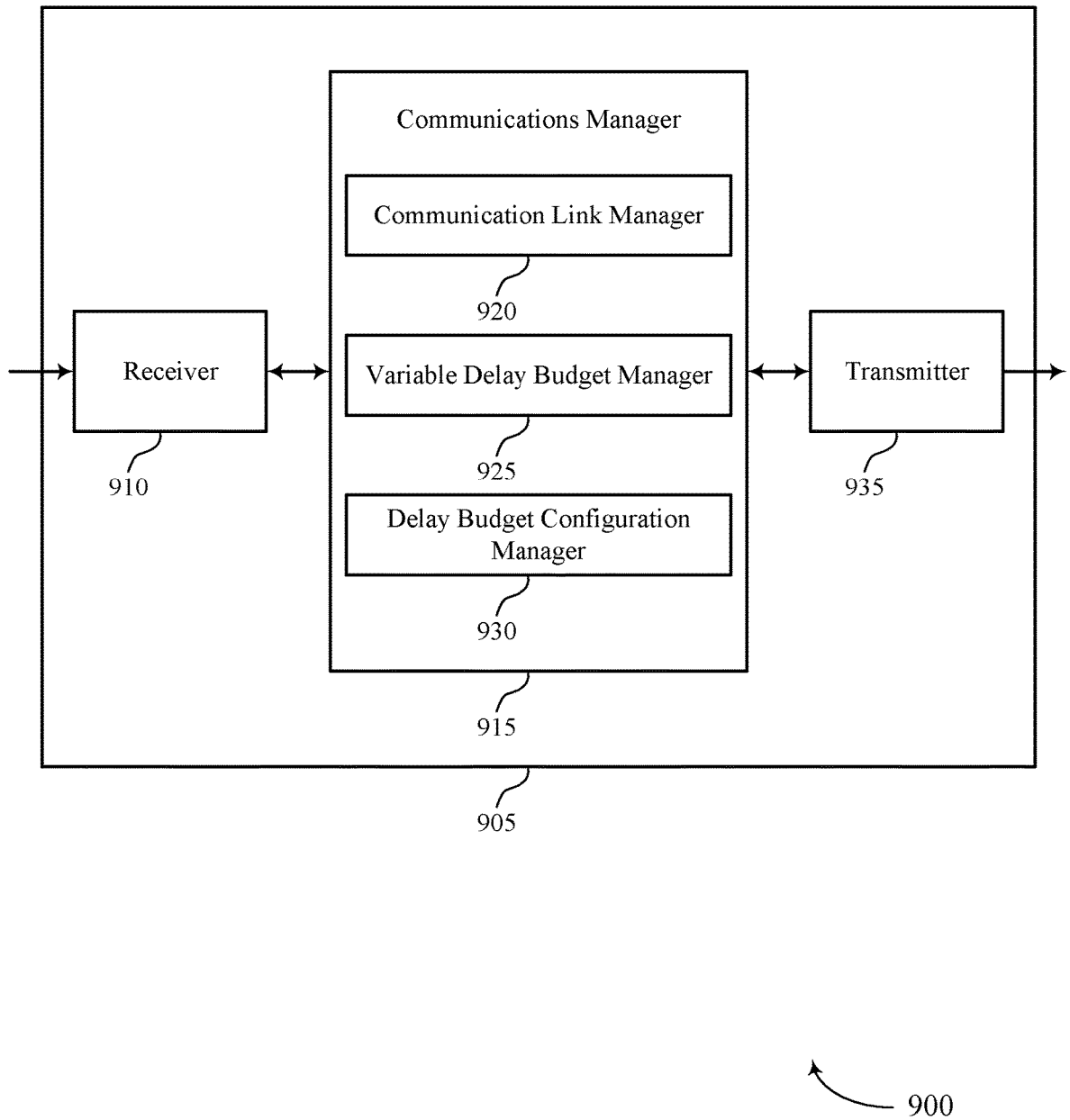

FIG. 9 shows a block diagram 900 of a device 905 that supports a delay budget for low latency communications in accordance with aspects of the present disclosure. The device 905 may be an example of aspects of a device 805 or a network entity, such as a UE 115, as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to delay budget for low latency communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a communication link manager 920, a variable delay budget manager 925, and a delay budget configuration manager 930. The communications manager 915 may be an example of aspects of the communications manager 1110 described herein. The communication link manager 920 may identify a communication link for traffic associated with a first latency type between a UE and a core network node via a radio access node.

The variable delay budget manager 925 may determine a first variable delay budget for communications of the first latency type between the radio access node and the core network node via the communication link. The delay budget configuration manager 930 may transmit, to the radio access node, a delay budget configuration indicating the first variable delay budget and a second variable delay budget for communications of the first latency type between the UE and the core network node via the communication link. The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
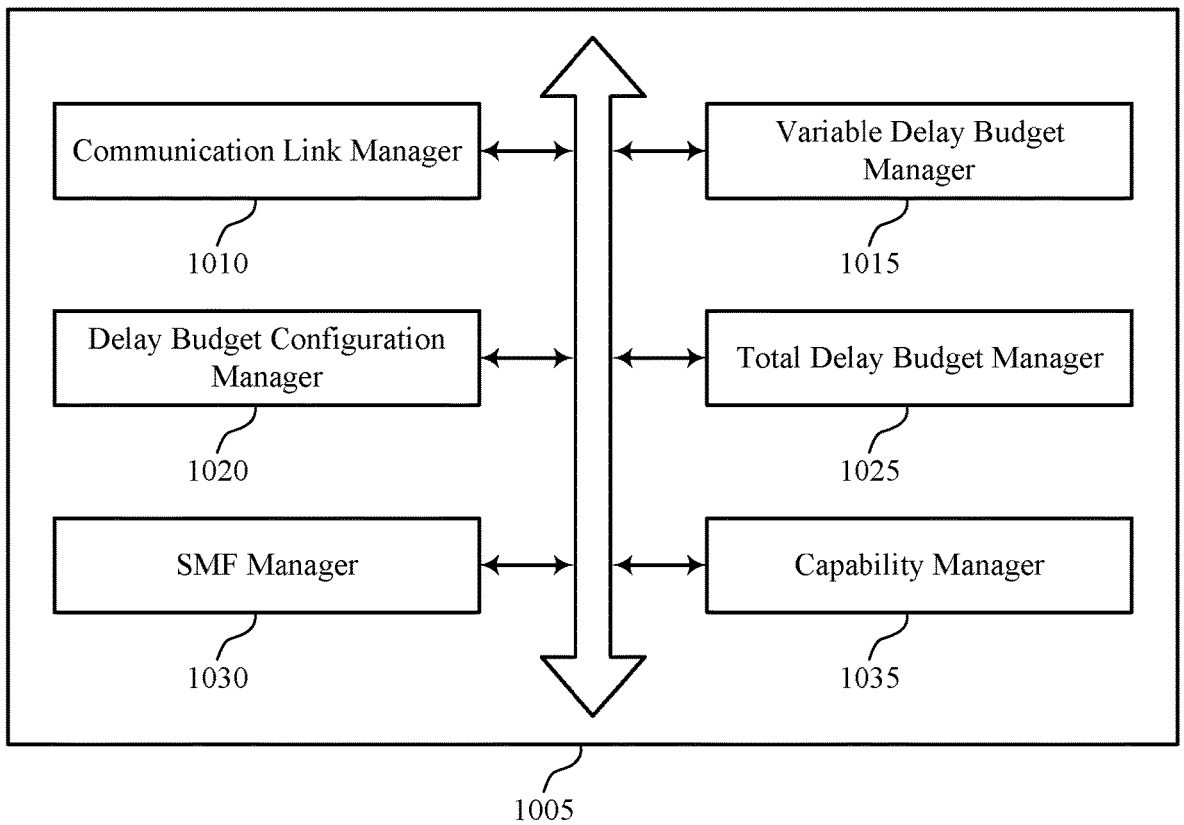
FIG. 10 shows a block diagram of a communications manager that supports a delay budget for low latency communications in accordance with aspects of the present disclosure.

FIG. 10 shows a block diagram 1000 of a communications manager 1005 that supports a delay budget for low latency communications in accordance with aspects of the present disclosure. The communications manager 1005 may be an example of aspects of a communications manager 815, a communications manager 915, or a communications manager 1110 described herein. The communications manager 1005 may include a communication link manager 1010, a variable delay budget manager 1015, a delay budget configuration manager 1020, a total delay budget manager 1025, an SMF manager 1030, and a capability manager 1035. Each of these modules may communicate, directly or indirectly, with one another (e.g., via one or more buses).

The communication link manager 1010 may identify a communication link for traffic associated with a first latency type between a UE and a core network node via a radio access node. In some cases, the communication link corresponds to a QoS flow associated with the first latency type. In some cases, the traffic associated with the first latency type includes TSN traffic.

The variable delay budget manager 1015 may determine a first variable delay budget for communications of the first latency type between the radio access node and the core network node via the communication link. In some examples, the variable delay budget manager 1015 may determine an uplink variable delay budget for uplink communications of the first latency type via the communication link. In some examples, the variable delay budget manager 1015 may determine a downlink variable delay budget for downlink communications of the first latency type via the communication link. In some examples, the variable delay budget manager 1015 may receive a request to establish or modify a QoS flow corresponding to the communication link, where the first variable delay budget is determined in response to the request.

In some examples, the variable delay budget manager 1015 may receive a request for handover of the UE, a PDU session establishment of the UE, a PDU session modification of the UE, or any combination thereof, where the first variable delay budget is determined in response to the request. In some examples, the variable delay budget manager 1015 may transmit a second IE that indicates the first variable delay budget. In some cases, the second variable delay budget is for communications of the first latency type via the communication link between the UE and the radio access node. In some cases, the uplink and downlink variable delay budgets are different. In some cases, the first variable delay budget is indicated as a fraction of the second variable delay budget.

The delay budget configuration manager 1020 may transmit, to the radio access node, a delay budget configuration indicating the first variable delay budget and a second variable delay budget for communications of the first latency type between the UE and the core network node via the communication link. In some examples, the delay budget configuration manager 1020 may transmit the delay budget configuration to a UPF. In some examples, the delay budget configuration manager 1020 may transmit the delay budget configuration based on a QoS associated with the UE, one or more QoS rules associated with the communication link, one or more uplink packet detection rules, one or more downlink packet detection rules, or any combination thereof.

The total delay budget manager 1025 may determine a total delay budget between the UE and the core network node for communications of the first latency type via the communication link based on the delay budget configuration. In some examples, the total delay budget manager 1025 may transmit a first IE that indicates a total delay budget between the UE and the core network node for communications of the first latency type via the communication link. The SMF manager 1030 may determine, at an SMF, the first variable delay budget between the radio access node and the core network node for communications of the first latency type via the communication link.

The capability manager 1035 may identify a set of RAN capabilities for the radio access node, where the first variable delay budget is determined based on the set of RAN capabilities. In some examples, the capability manager 1035 may identify a set of system capabilities for communications between the UE and the core network node, where the first variable delay budget is determined based on the set of system capabilities.

In some examples, the capability manager 1035 may determine configuration information of the UE, the radio access node, or the core network node, where the first variable delay budget is determined based on the configuration information. In some cases, the set of RAN capabilities includes a subcarrier spacing for communications via the radio access node, support for mini slot communications via the radio access node, a frame structure for communications via the radio access node, a bandwidth for communications via the radio access node, a bandwidth part for communications via the radio access node, or any combination thereof. In some cases, the set of system capabilities includes a delay bound for traffic associated with the first latency type, a traffic class for traffic associated with the first latency type, or any combination thereof. In some cases, the configuration information is based on a TSN procedure for determining a capability of a wireless communications system. In some cases, the configuration information includes dynamic information from a TSN system associated with the UE or a TSN traffic class associated with a QoS flow corresponding to the communication link. In some cases, the configuration information includes subscription information associated with the UE.

Figure 11:
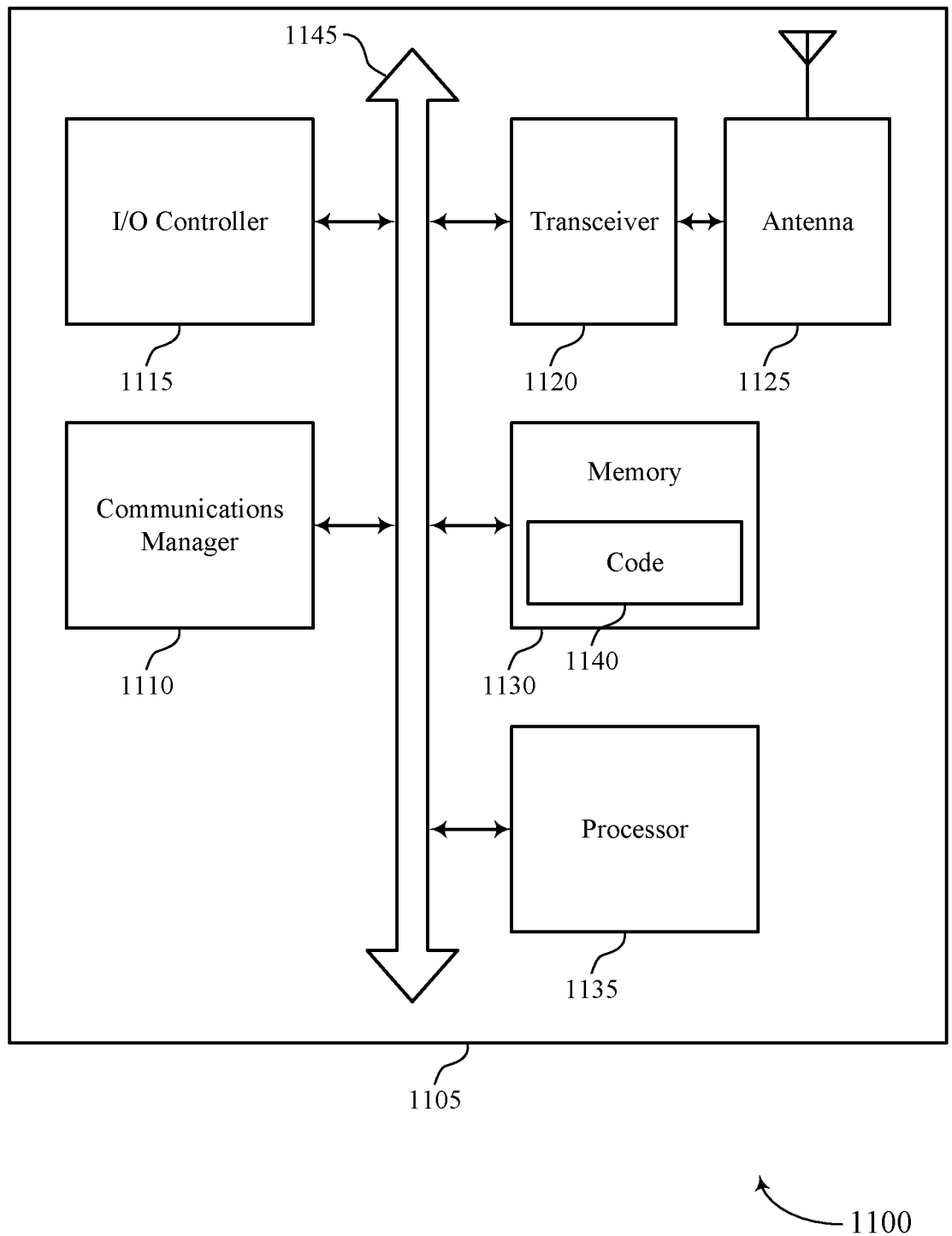
FIG. 11 shows a diagram of a system including a device that supports a delay budget for low latency communications in accordance with aspects of the present disclosure.

FIG. 11 shows a diagram of a system 1100 including a device 1105 that supports a delay budget for low latency communications in accordance with aspects of the present disclosure. The device 1105 may be an example of or include the components of device 805, device 905, or a network entity as described herein. The device 1105 may include components for bi-directional voice and data communications including components for transmitting and receiving communications, including a communications manager 1110, an I/O controller 1115, a transceiver 1120, an antenna 1125, memory 1130, and a processor 1135. These components may be in electronic communication via one or more buses (e.g., bus 1145).

The communications manager 1110 may identify a communication link for traffic associated with a first latency type between a UE and a core network node via a radio access node, determine a first variable delay budget for communications of the first latency type between the radio access node and the core network node via the communication link, and transmit, to the radio access node, a delay budget configuration indicating the first variable delay budget and a second variable delay budget for communications of the first latency type between the UE and the core network node via the communication link.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1140 including instructions that, when executed, cause the processor to perform various functions described herein. In some cases, the memory 1130 may contain, among other things, a BIOS which may control basic hardware or software operation such as the interaction with peripheral components or devices.

The processor 1135 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1135 may be configured to operate a memory array using a memory controller. In other cases, a memory controller may be integrated into the processor 1135. The processor 1135 may be configured to execute computer-readable instructions stored in a memory (e.g., the memory 1130) to cause the device 1105 to perform various functions (e.g., functions or tasks supporting delay budget for low latency communications).

The code 1140 may include instructions to implement aspects of the present disclosure, including instructions to support wireless communications. The code 1140 may be stored in a non-transitory computer-readable medium such as system memory or other type of memory. In some cases, the code 1140 may not be directly executable by the processor 1135 but may cause a computer (e.g., when compiled and executed) to perform functions described herein.

Figure 12:
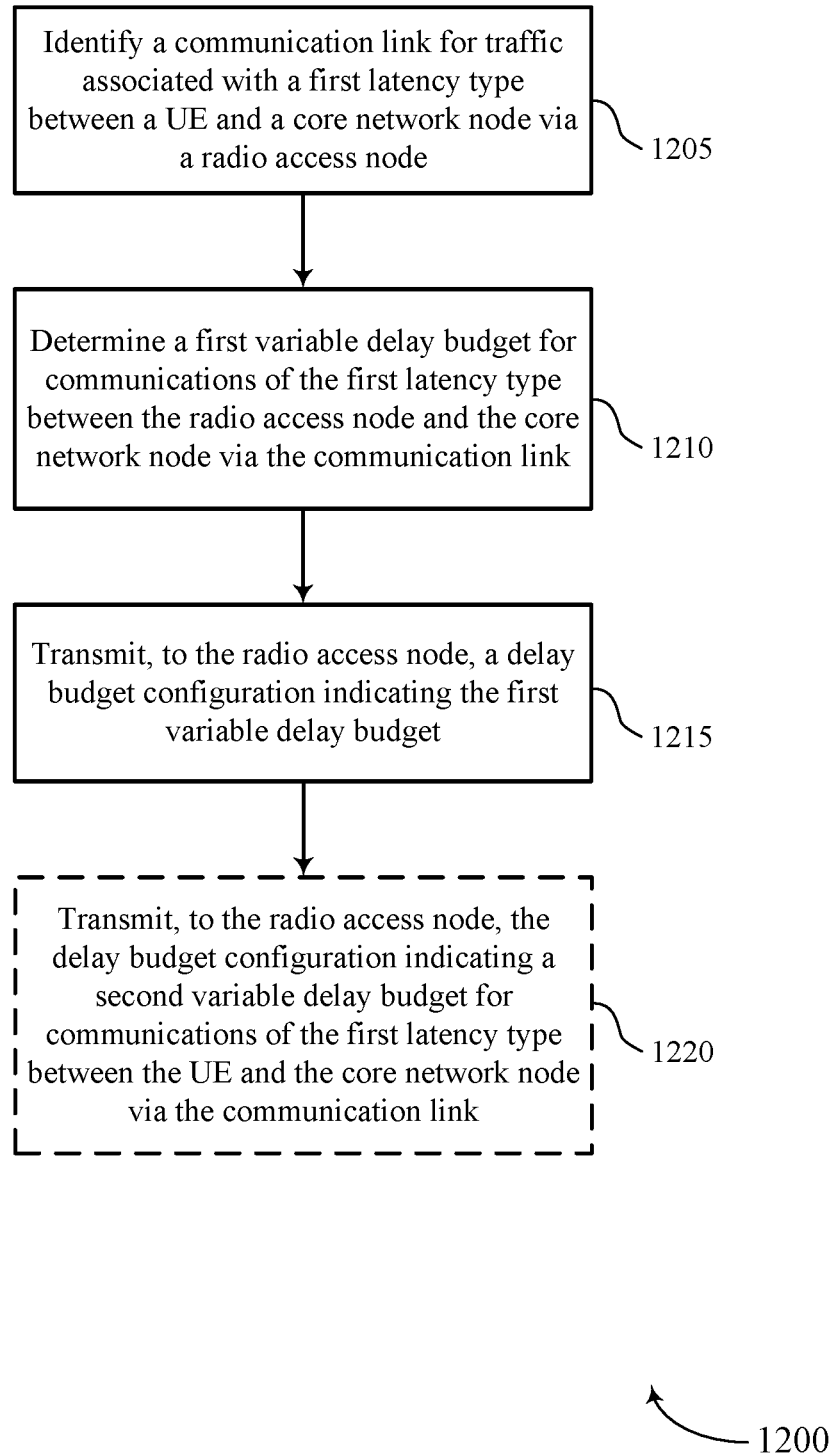
FIGS. 12 through 16 show flowcharts illustrating methods that support a delay budget for low latency communications in accordance with aspects of the present disclosure.

FIG. 12 shows a flowchart illustrating a method 1200 that supports a delay budget for low latency communications in accordance with aspects of the present disclosure. The operations of method 1200 may be implemented by a network entity or its components as described herein. For example, the operations of method 1200 may be performed by a communications manager as described with reference to FIGS. 8 through 11. In some examples, a network entity may execute a set of instructions to control the functional elements of the network entity to perform the functions described herein. Additionally or alternatively, a network entity may perform aspects of the functions described herein using special-purpose hardware.

At 1205, the network entity may identify a communication link for traffic associated with a first latency type between a UE and a core network node via a radio access node. The operations of 1205 may be performed according to the methods described herein. In some examples, aspects of the operations of 1205 may be performed by a communication link manager as described with reference to FIGS. 8 through 11.

At 1210, the network entity may determine a first variable delay budget for communications of the first latency type between the radio access node and the core network node via the communication link. The operations of 1210 may be performed according to the methods described herein. In some examples, aspects of the operations of 1210 may be performed by a variable delay budget manager as described with reference to FIGS. 8 through 11.

At 1215, the network entity may transmit, to the radio access node, a delay budget configuration indicating the first variable delay budget. The operations of 1215 may be performed according to the methods described herein. In some examples, aspects of the operations of 1215 may be performed by a delay budget configuration manager as described with reference to FIGS. 8 through 11.

At 1220, the network entity may optionally transmit, to the radio access node, the delay budget configuration indicating a second variable delay budget for communications of the first latency type between the UE and the core network node via the communication link. The operations of 1220 may be performed according to the methods described herein. In some examples, aspects of the operations of 1220 may be performed by a delay budget configuration manager as described with reference to FIGS. 8 through 11.

Some wireless communications systems may be used to facilitate communications in networks that rely on relatively strict timing synchronization of network components, sometimes referred to as TSN systems. In some wireless communications system, a QoS standard for a particular QoS flow may define a target PDB. The target PDB may set a target latency or total time delay for communications between a UE and a network entity of the wireless communications system below which communicated data packets may be used. The PDB may also include a second delay component incurred between the radio access node and the UE. Together, this total PDB defines a target latency from the network entity to the UE via the radio access node.

The radio access node may use the first component of the delay incurred between the network entity and the radio access node to schedule uplink and downlink transmissions. In some wireless communications systems, the first component of the delay that is incurred between the network entity and the radio access node may be configured to be a defined delay (e.g., 1 ms). However, in for example, a wireless communications system carrying TSN communications, deployments are contemplated in which the network entity and the radio access node are located in relatively close geographic proximity, and thus the first component of the delay may be substantially less than the defined delay (e.g., meaningfully less than the configured delay of 1 ms). Thus, if the radio access node schedules communications with the UE based on the configured delay, scheduling decisions may be either overly aggressive or overly conservative, depending on the actual delay.

Accordingly, the method 1200 provided herein provides for signaling to the radio access node the delay budget configuration that indicates a first variable delay budget between the radio access node and the network entity node and a second variable delay budget for communications between the UE and the network entity node. Based on the delay budget configuration, the radio access node may determine an estimate of the actual delay in such communications of the wireless communications system. Thus, based on signaling the determined delays to the radio access node, the radio access node may relatively more accurately schedule communications between the UE, radio access node, and network entity.

Figure 13:
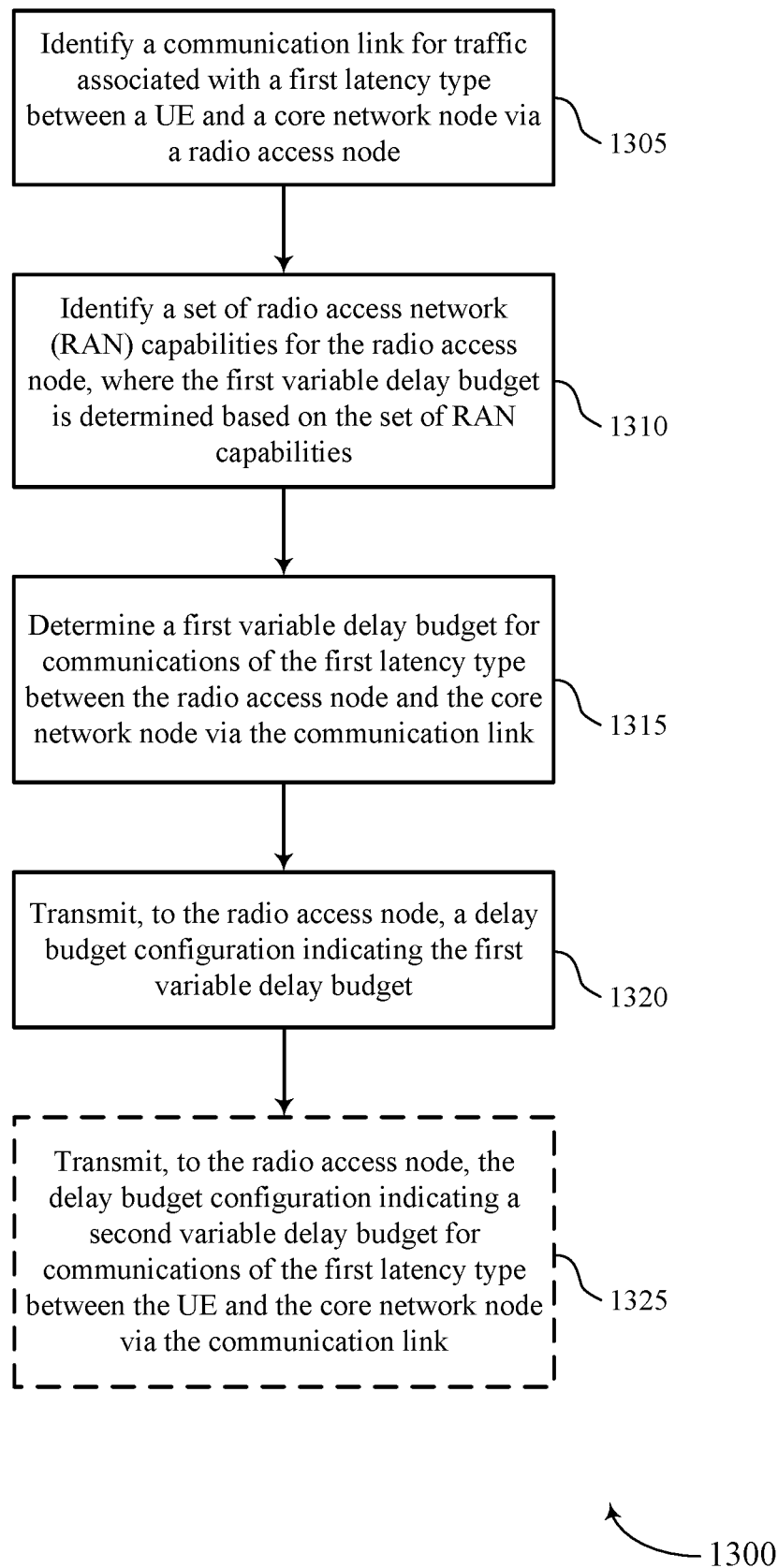

FIG. 13 shows a flowchart illustrating a method 1300 that supports a delay budget for low latency communications in accordance with aspects of the present disclosure. The operations of method 1300 may be implemented by a network entity or its components as described herein. For example, the operations of method 1300 may be performed by a communications manager as described with reference to FIGS. 8 through 11. In some examples, a network entity may execute a set of instructions to control the functional elements of the network entity to perform the functions described herein. Additionally or alternatively, a network entity may perform aspects of the functions described herein using special-purpose hardware.

At 1305, the network entity may identify a communication link for traffic associated with a first latency type between a UE and a core network node via a radio access node. The operations of 1305 may be performed according to the methods described herein. In some examples, aspects of the operations of 1305 may be performed by a communication link manager as described with reference to FIGS. 8 through 11.

At 1310, the network entity may identify a set of RAN capabilities for the radio access node, where the first variable delay budget is determined based on the set of RAN capabilities. The operations of 1310 may be performed according to the methods described herein. In some examples, aspects of the operations of 1310 may be performed by a capability manager as described with reference to FIGS. 8 through 11.

At 1315, the network entity may determine a first variable delay budget for communications of the first latency type between the radio access node and the core network node via the communication link. The operations of 1315 may be performed according to the methods described herein. In some examples, aspects of the operations of 1315 may be performed by a variable delay budget manager as described with reference to FIGS. 8 through 11.

At 1320, the network entity may transmit, to the radio access node, a delay budget configuration indicating the first variable delay budget. The operations of 1320 may be performed according to the methods described herein. In some examples, aspects of the operations of 1320 may be performed by a delay budget configuration manager as described with reference to FIGS. 8 through 11.

At 1325, the network entity may optionally transmit, to the radio access node, a delay budget configuration indicating a second variable delay budget for communications of the first latency type between the UE and the core network node via the communication link. The operations of 1325 may be performed according to the methods described herein. In some examples, aspects of the operations of 1325 may be performed by a delay budget configuration manager as described with reference to FIGS. 8 through 11.

Some wireless communications systems may be used to facilitate communications in networks that rely on relatively strict timing synchronization of network components, sometimes referred to as TSN systems. In some wireless communications system, a QoS standard for a particular QoS flow may define a target PDB. The target PDB may set a target latency or total time delay for communications between a UE and a network entity of the wireless communications system below which communicated data packets may be used. The PDB may also include a second delay component incurred between the radio access node and the UE. Together, this total PDB defines a target latency from the network entity to the UE via the radio access node.

The radio access node may use the first component of the delay incurred between the network entity and the radio access node to schedule uplink and downlink transmissions. In some wireless communications systems, the first component of the delay that is incurred between the network entity and the radio access node may be configured to be a defined delay (e.g., 1 ms). However, in for example, a wireless communications system carrying TSN communications, deployments are contemplated in which the network entity and the radio access node are located in relatively close geographic proximity, and thus the first component of the delay may be substantially less than the defined delay (e.g., meaningfully less than the configured delay of 1 ms). Thus, if the radio access node schedules communications with the UE based on the configured delay, scheduling decisions may be either overly aggressive or overly conservative, depending on the actual delay.

Accordingly, the method 1300 provided herein provides for signaling to the radio access node the delay budget configuration that indicates a first variable delay budget between the radio access node and the network entity node and a second variable delay budget for communications between the UE and the network entity node. By identifying identify the set of RAN capabilities for the radio access node, where the first variable delay budget is determined based on the set of RAN capabilities, the network entity may provide for a relatively accurate determination of the first variable delay budget. Based on the delay budget configuration, the radio access node may determine an estimate of the actual delay in such communications of the wireless communications system. Thus, based on signaling the determined delays to the radio access node, the radio access node may relatively more accurately schedule communications between the UE, radio access node, and network entity.

Figure 14:
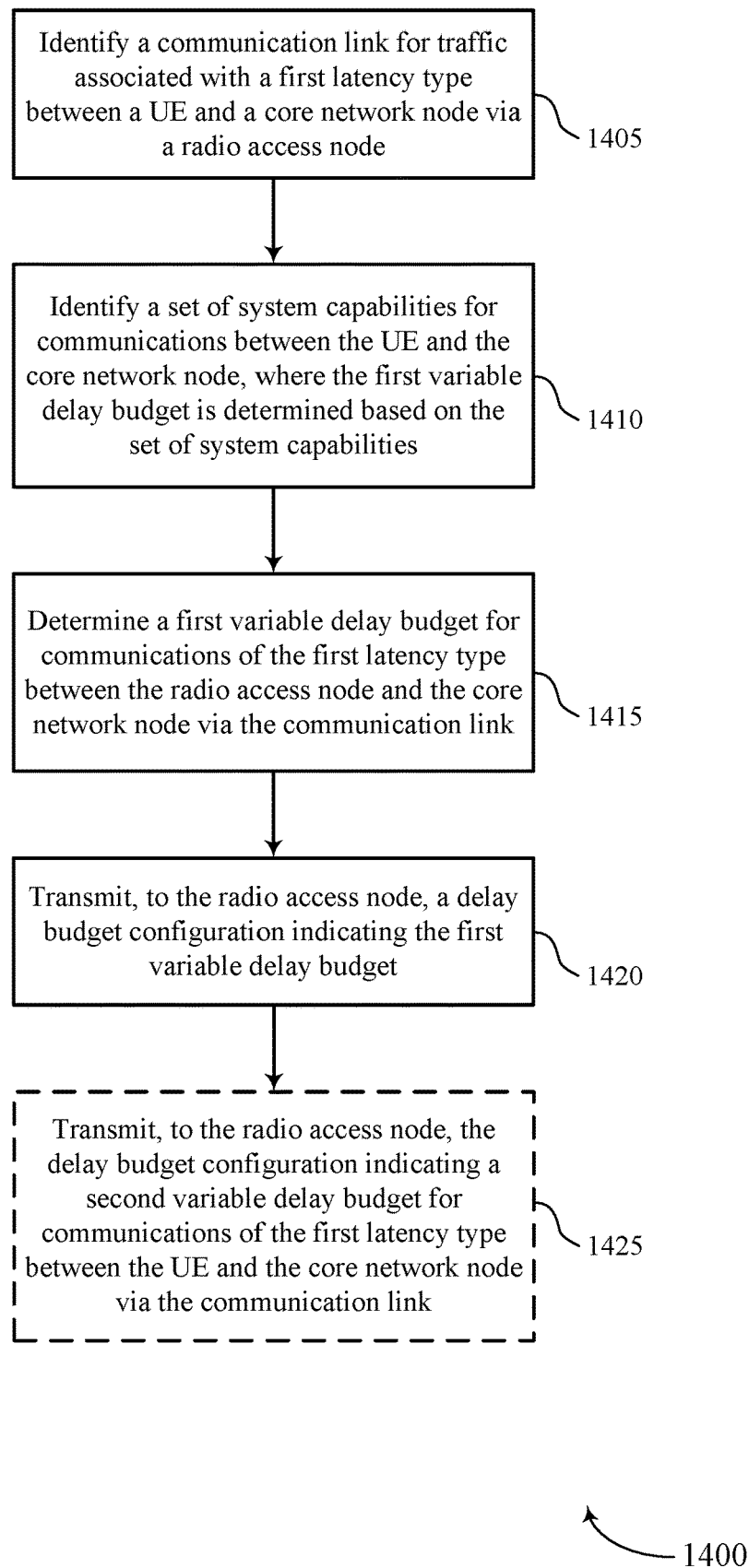

FIG. 14 shows a flowchart illustrating a method 1400 that supports a delay budget for low latency communications in accordance with aspects of the present disclosure. The operations of method 1400 may be implemented by a network entity or its components as described herein. For example, the operations of method 1400 may be performed by a communications manager as described with reference to FIGS. 8 through 11. In some examples, a network entity may execute a set of instructions to control the functional elements of the network entity to perform the functions described herein. Additionally or alternatively, a network entity may perform aspects of the functions described herein using special-purpose hardware.

At 1405, the network entity may identify a communication link for traffic associated with a first latency type between a UE and a core network node via a radio access node. The operations of 1405 may be performed according to the methods described herein. In some examples, aspects of the operations of 1405 may be performed by a communication link manager as described with reference to FIGS. 8 through 11.

At 1410, the network entity may identify a set of system capabilities for communications between the UE and the core network node, where the first variable delay budget is determined based on the set of system capabilities. The operations of 1410 may be performed according to the methods described herein. In some examples, aspects of the operations of 1410 may be performed by a capability manager as described with reference to FIGS. 8 through 11.

At 1415, the network entity may determine a first variable delay budget for communications of the first latency type between the radio access node and the core network node via the communication link. The operations of 1415 may be performed according to the methods described herein. In some examples, aspects of the operations of 1415 may be performed by a variable delay budget manager as described with reference to FIGS. 8 through 11.

At 1420, the network entity may transmit, to the radio access node, a delay budget configuration indicating the first variable delay budget. The operations of 1420 may be performed according to the methods described herein. In some examples, aspects of the operations of 1420 may be performed by a delay budget configuration manager as described with reference to FIGS. 8 through 11.

At 1425, the network entity may optionally transmit, to the radio access node, a delay budget configuration indicating a second variable delay budget for communications of the first latency type between the UE and the core network node via the communication link. The operations of 1425 may be performed according to the methods described herein. In some examples, aspects of the operations of 1425 may be performed by a delay budget configuration manager as described with reference to FIGS. 8 through 11.

Some wireless communications systems may be used to facilitate communications in networks that rely on relatively strict timing synchronization of network components, sometimes referred to as TSN systems. In some wireless communications system, a QoS standard for a particular QoS flow may define a target PDB. The target PDB may set a target latency or total time delay for communications between a UE and a network entity of the wireless communications system below which communicated data packets may be used. The PDB may also include a second delay component incurred between the radio access node and the UE. Together, this total PDB defines a target latency from the network entity to the UE via the radio access node.

The radio access node may use the first component of the delay incurred between the network entity and the radio access node to schedule uplink and downlink transmissions. In some wireless communications systems, the first component of the delay that is incurred between the network entity and the radio access node may be configured to be a defined delay (e.g., 1 ms). However, in for example, a wireless communications system carrying TSN communications, deployments are contemplated in which the network entity and the radio access node are located in relatively close geographic proximity, and thus the first component of the delay may be substantially less than the defined delay (e.g., meaningfully less than the configured delay of 1 ms). Thus, if the radio access node schedules communications with the UE based on the configured delay, scheduling decisions may be either overly aggressive or overly conservative, depending on the actual delay.

Accordingly, the method 1400 provided herein provides for signaling to the radio access node the delay budget configuration that indicates a first variable delay budget between the radio access node and the network entity node and a second variable delay budget for communications between the UE and the network entity node. By identifying the set of system capabilities for communications between the UE and the core network node, where the first variable delay budget is determined based on the set of system capabilities, the network entity may provide for a relatively accurate determination of the first variable delay budget. Based on the delay budget configuration, the radio access node may determine an estimate of the actual delay in such communications of the wireless communications system. Thus, based on signaling the determined delays to the radio access node, the radio access node may relatively more accurately schedule communications between the UE, radio access node, and network entity.

Figure 15:
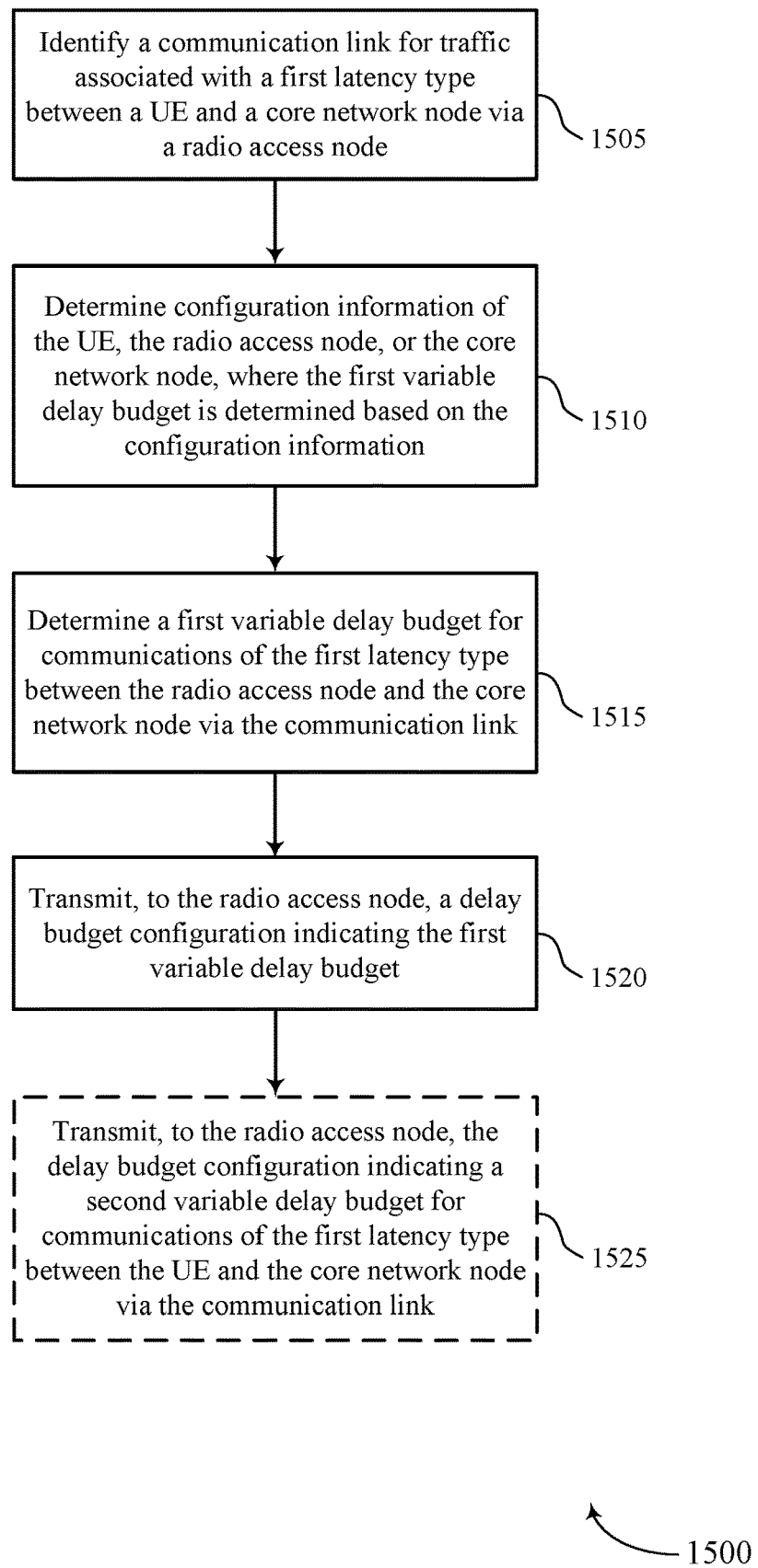

FIG. 15 shows a flowchart illustrating a method 1500 that supports a delay budget for low latency communications in accordance with aspects of the present disclosure. The operations of method 1500 may be implemented by a network entity or its components as described herein. For example, the operations of method 1500 may be performed by a communications manager as described with reference to FIGS. 8 through 11. In some examples, a network entity may execute a set of instructions to control the functional elements of the network entity to perform the functions described herein. Additionally or alternatively, a network entity may perform aspects of the functions described herein using special-purpose hardware.

At 1505, the network entity may identify a communication link for traffic associated with a first latency type between a UE and a core network node via a radio access node. The operations of 1505 may be performed according to the methods described herein. In some examples, aspects of the operations of 1505 may be performed by a communication link manager as described with reference to FIGS. 8 through 11.

At 1510, the network entity may determine configuration information of the UE, the radio access node, or the core network node, where the first variable delay budget is determined based on the configuration information. The operations of 1510 may be performed according to the methods described herein. In some examples, aspects of the operations of 1510 may be performed by a capability manager as described with reference to FIGS. 8 through 11.

At 1515, the network entity may determine a first variable delay budget for communications of the first latency type between the radio access node and the core network node via the communication link. The operations of 1515 may be performed according to the methods described herein. In some examples, aspects of the operations of 1515 may be performed by a variable delay budget manager as described with reference to FIGS. 8 through 11.

At 1520, the network entity may transmit, to the radio access node, a delay budget configuration indicating the first variable delay budget. The operations of 1520 may be performed according to the methods described herein. In some examples, aspects of the operations of 1520 may be performed by a delay budget configuration manager as described with reference to FIGS. 8 through 11.

At 1525, the network entity may optionally transmit, to the radio access node, a delay budget configuration indicating a second variable delay budget for communications of the first latency type between the UE and the core network node via the communication link. The operations of 1525 may be performed according to the methods described herein. In some examples, aspects of the operations of 1525 may be performed by a delay budget configuration manager as described with reference to FIGS. 8 through 11.

Some wireless communications systems may be used to facilitate communications in networks that rely on relatively strict timing synchronization of network components, sometimes referred to as TSN systems. In some wireless communications system, a QoS requirement for a particular QoS flow may define a target PDB. The target PDB may set a target latency or total time delay for communications between a UE and a network entity of the wireless communications system below which communicated data packets may be used. The PDB may also include a second delay component incurred between the radio access node and the UE. Together, this total PDB defines a target latency from the network entity to the UE via the radio access node.

The radio access node may use the first component of the delay incurred between the network entity and the radio access node to schedule uplink and downlink transmissions. In some wireless communications systems, the first component of the delay that is incurred between the network entity and the radio access node may be configured to be a defined delay (e.g., 1 ms). However, in for example, a wireless communications system carrying TSN communications, deployments are contemplated in which the network entity and the radio access node are located in relatively close geographic proximity, and thus the first component of the delay may be substantially less than the defined delay (e.g., meaningfully less than the configured delay of 1 ms). Thus, if the radio access node schedules communications with the UE based on the configured delay, scheduling decisions may be either overly aggressive or overly conservative, depending on the actual delay.

Accordingly, the method 1500 provided herein provides for signaling to the radio access node the delay budget configuration that indicates a first variable delay budget between the radio access node and the network entity node and a second variable delay budget for communications between the UE and the network entity node. By determine configuration information of the UE, the radio access node, or the core network node, where the first variable delay budget is determined based on the configuration information, the network entity may provide for a relatively accurate determination of the first variable delay budget. Based on the delay budget configuration, the radio access node may determine an estimate of the actual delay in such communications of the wireless communications system. Thus, based on signaling the determined delays to the radio access node, the radio access node may relatively more accurately schedule communications between the UE, radio access node, and network entity.

Figure 16:
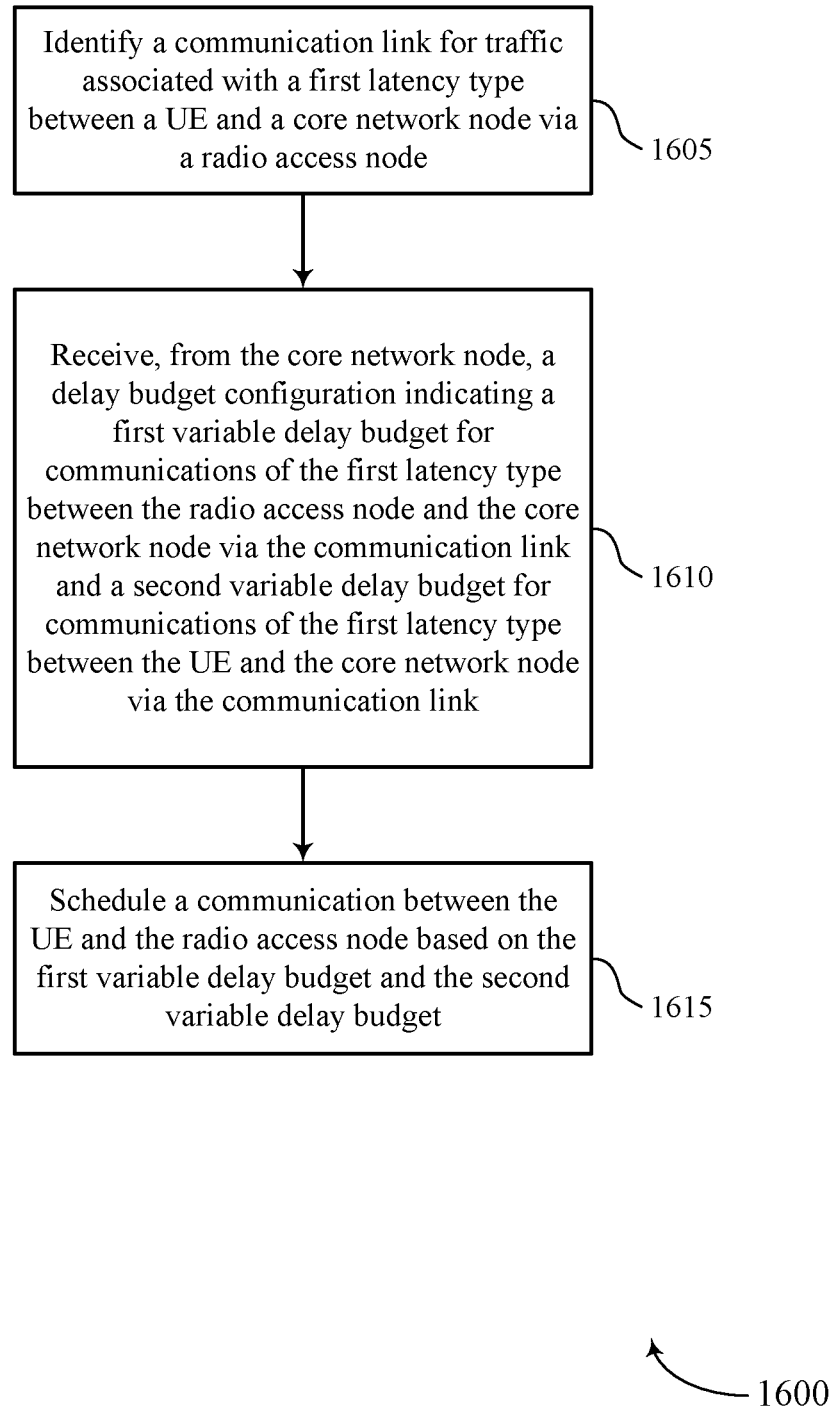

FIG. 16 shows a flowchart illustrating a method 1600 that supports a delay budget for low latency communications in accordance with aspects of the present disclosure. The operations of method 1600 may be implemented by a base station 105 or its components as described herein. For example, the operations of method 1600 may be performed by a communications manager as described with reference to FIGS. 4 through 7. In some examples, a base station may execute a set of instructions to control the functional elements of the base station to perform the functions described herein. Additionally or alternatively, a base station may perform aspects of the functions described herein using special-purpose hardware.

At 1605, the base station may identify a communication link for traffic associated with a first latency type between a UE and a core network node via a radio access node. The operations of 1605 may be performed according to the methods described herein. In some examples, aspects of the operations of 1605 may be performed by a communication link module as described with reference to FIGS. 4 through 7.

At 1610, the base station may receive, from the core network node, a delay budget configuration indicating a first variable delay budget for communications of the first latency type between the radio access node and the core network node via the communication link and a second variable delay budget for communications of the first latency type between the UE and the core network node via the communication link. The operations of 1610 may be performed according to the methods described herein. In some examples, aspects of the operations of 1610 may be performed by a delay budget configuration module as described with reference to FIGS. 4 through 7.

At 1615, the base station may schedule a communication between the UE and the radio access node based on the first variable delay budget and the second variable delay budget. The operations of 1615 may be performed according to the methods described herein. In some examples, aspects of the operations of 1615 may be performed by a communication scheduler as described with reference to FIGS. 4 through 7.

Some wireless communications systems may be used to facilitate communications in networks that rely on relatively strict timing synchronization of network components, sometimes referred to as TSN systems. In some wireless communications system, a QoS standard for a particular QoS flow may define a target PDB. The target PDB may set a target latency or total time delay for communications between a UE and a network entity of the wireless communications system below which communicated data packets may be used. The PDB may also include a second delay component incurred between the radio access node and the UE. Together, this total PDB defines a target latency from the network entity to the UE via the radio access node.

The radio access node may use the first component of the delay incurred between the network entity and the radio access node to schedule uplink and downlink transmissions. In some wireless communications systems, the first component of the delay that is incurred between the network entity and the radio access node may be configured to be a defined delay (e.g., 1 ms). However, in for example, a wireless communications system carrying TSN communications, deployments are contemplated in which the network entity and the radio access node are located in relatively close geographic proximity, and thus the first component of the delay may be substantially less than the defined delay (e.g., meaningfully less than the configured delay of 1 ms). Thus, if the radio access node schedules communications with the UE based on the configured delay, scheduling decisions may be either overly aggressive or overly conservative, depending on the actual delay.

Accordingly, the method 1600 provided herein provides for signaling to the radio access node the delay budget configuration that indicates a first variable delay budget between the radio access node and the network entity node and a second variable delay budget for communications between the UE and the network entity node. Based on the delay budget configuration, the radio access node may determine an estimate of the actual delay in such communications of the wireless communications system. Thus, based on signaling the determined delays to the radio access node, the radio access node may relatively more accurately schedule communications between the UE, radio access node, and network entity.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a core network node, comprising:
   identifying a communication link for traffic associated with a first latency type between a user equipment (UE) and the core network node via a radio access node;
   determining a first variable delay budget for communications of the first latency type between the radio access node and the core network node via the communication link; and
   transmitting, to the radio access node, a delay budget configuration, wherein transmitting the delay budget configuration comprises transmitting a first information element (IE) that indicates a total delay budget between the UE and the core network node for communications of the first latency type via the communication link and a second IE that indicates the first variable delay budget; and wherein the total delay budget and first variable delay budget are different.

2. The method of claim 1, wherein determining the first variable delay budget comprises:
determining an uplink variable delay budget for uplink communications of the first latency type via the communication link; and
determining a downlink variable delay budget for downlink communications of the first latency type via the communication link.

3. The method of claim 2, wherein the uplink and downlink variable delay budgets are different.

4. The method of claim 1, wherein the total delay budget is
based at least in part on the delay budget configuration.

5. The method of claim 1, wherein determining the first variable delay budget comprises:
determining, at a session management function (SMF), the first variable delay budget between the radio access node and the core network node for communications of the first latency type via the communication link.

6. The method of claim 5, further comprising:
transmitting the delay budget configuration to a user plane function (UPF).

7. The method of claim 5, further comprising:
receiving a request to establish or modify a quality of service (QoS) flow corresponding to the communication link, wherein the first variable delay budget is determined in response to the request.

8. The method of claim 5, further comprising:
receiving a request for handover of the UE, a packet data unit (PDU) session establishment of the UE, a PDU session modification of the UE, or any combination thereof, wherein the first variable delay budget is determined in response to the request.

9. The method of claim 1, further comprising:
identifying a set of radio access network (RAN) capabilities for the radio access node, wherein the first variable delay budget is determined based at least in part on the set of RAN capabilities.

10. The method of claim 9, wherein the set of RAN capabilities comprises a subcarrier spacing for communications via the radio access node, support for mini slot communications via the radio access node, a frame structure for communications via the radio access node, a bandwidth for communications via the radio access node, a bandwidth part for communications via the radio access node, or any combination thereof.

11. The method of claim 1, further comprising:
identifying a set of system capabilities for communications between the UE and the core network node, wherein the first variable delay budget is determined based at least in part on the set of system capabilities.

12. The method of claim 11, wherein the set of system capabilities comprises a delay bound for traffic associated with the first latency type, a traffic class for traffic associated with the first latency type, or any combination thereof.

13. The method of claim 1, further comprising:
determining configuration information of the UE, the radio access node, or the core network node, wherein the first variable delay budget is determined based at least in part on the configuration information.

14. The method of claim 13, wherein the configuration information is based at least in part on a time sensitive networking (TSN) procedure for determining a capability of a wireless communications system.

15. The method of claim 13, wherein the configuration information comprises dynamic information from a time sensitive networking (TSN) system associated with the UE or a TSN traffic class associated with a quality of service (QoS) flow corresponding to the communication link.

16. The method of claim 13, wherein the configuration information comprises subscription information associated with the UE.

17. The method of claim 1, further comprising:
transmitting the delay budget configuration based at least in part on a quality of service (QoS) associated with the UE, one or more QoS rules associated with the communication link, one or more uplink packet detection rules, one or more downlink packet detection rules, or any combination thereof.

18. The method of claim 1, wherein the first variable delay budget is indicated as a fraction of a second variable delay budget.

19. The method of claim 1, wherein the communication link corresponds to a quality of service (QoS) flow associated with the first latency type.

20. The method of claim 1, wherein the traffic associated with the first latency type comprises time sensitive networking (TSN) traffic.

21. A method for wireless communications at a radio access node, comprising:
identifying a communication link for traffic associated with a first latency type between a user equipment (UE) and a core network node via the radio access node;
receiving, from the core network node, a delay budget configuration indicating a first variable delay budget for communications of the first latency type between the radio access node and the core network node via the communication link, wherein receiving the delay budget configuration comprises receiving a first information element (IE) that indicates a total delay budget between the UE and the core network node for communications of the first latency type via the communication link and a second IE that indicates the first variable delay budget; wherein the total delay budget and first variable delay budget are different; and
scheduling a communication between the UE and the radio access node based at least in part on the first variable delay budget.

22. The method of claim 21, further comprising:
identifying an uplink variable delay budget for uplink communications of the first latency type via the communication link based at least in part on the delay budget configuration; and
identifying a downlink variable delay budget for downlink communications of the first latency type via the communication link based at least in part on the delay budget configuration, wherein the communication between the UE and the radio access node is scheduled based at least in part on the uplink variable delay budget or the downlink variable delay budget.

23. The method of claim 22, wherein the uplink and downlink variable delay budgets are different.

24. The method of claim 21, wherein the first variable delay budget is indicated as a fraction of a second variable delay budget.

25. The method of claim 21, wherein the communication link corresponds to a quality of service (QoS) flow associated with the first latency type.

26. The method of claim 21, wherein the traffic associated with the first latency type comprises time sensitive networking (TSN) traffic.

27. An apparatus for wireless communications at a core network node, comprising:
a processor,
memory coupled with the processor; and
instructions stored in the memory and executable by the processor to cause the apparatus to:
identify a communication link for traffic associated with a first latency type between a user equipment (UE) and the core network node via a radio access node;
determine a first variable delay budget for communications of the first latency type between the radio access node and the core network node via the communication link; and
transmit, to the radio access node, a delay budget configuration, wherein transmitting the delay budget configuration comprises transmitting a first information element (IE) that indicates a total delay budget between the UE and the core network node for communications of the first latency type via the communication link and a second IE that indicates the first variable delay budget; and wherein the total delay budget and first variable delay budget are different.

28. The apparatus of claim 27, wherein the instructions to determine the first variable delay budget are executable by the processor to cause the apparatus to:
determine an uplink variable delay budget for uplink communications of the first latency type via the communication link; and
determine a downlink variable delay budget for downlink communications of the first latency type via the communication link.

29. The apparatus of claim 28, wherein the uplink and downlink variable delay budgets are different.

30. The apparatus of claim 27, wherein the total delay budget is based at least in part on the delay budget configuration.

31. The apparatus of claim 27, wherein the instructions to determine the first variable delay budget are executable by the processor to cause the apparatus to:
determine, at a session management function (SMF), the first variable delay budget between the radio access node and the core network node for communications of the first latency type via the communication link.

32. The apparatus of claim 31, wherein the instructions are further executable by the processor to cause the apparatus to:
transmit the delay budget configuration to a user plane function (UPF).

33. The apparatus of claim 31, wherein the instructions are further executable by the processor to cause the apparatus to:
receive a request to establish or modify a quality of service (QoS) flow corresponding to the communication link, wherein the first variable delay budget is determined in response to the request.

34. The apparatus of claim 31, wherein the instructions are further executable by the processor to cause the apparatus to:
receive a request for handover of the UE, a packet data unit (PDU) session establishment of the UE, a PDU session modification of the UE, or any combination thereof, wherein the first variable delay budget is determined in response to the request.

35. The apparatus of claim 27, wherein the instructions are further executable by the processor to cause the apparatus to:
identify a set of radio access network (RAN) capabilities for the radio access node, wherein the first variable delay budget is determined based at least in part on the set of RAN capabilities.

36. The apparatus of claim 35, wherein the set of RAN capabilities comprises a subcarrier spacing for communications via the radio access node, support for mini slot communications via the radio access node, a frame structure for communications via the radio access node, a bandwidth for communications via the radio access node, a bandwidth part for communications via the radio access node, or any combination thereof.

37. The apparatus of claim 27, wherein the instructions are further executable by the processor to cause the apparatus to:
identify a set of system capabilities for communications between the UE and the core network node, wherein the first variable delay budget is determined based at least in part on the set of system capabilities.

38. The apparatus of claim 37, wherein the set of system capabilities comprises a delay bound for traffic associated with the first latency type, a traffic class for traffic associated with the first latency type, or any combination thereof.

39. The apparatus of claim 27, wherein the instructions are further executable by the processor to cause the apparatus to:
determine configuration information of the UE, the radio access node, or the core network node, wherein the first variable delay budget is determined based at least in part on the configuration information.

40. The apparatus of claim 39, wherein the configuration information is based at least in part on a time sensitive networking (TSN) procedure for determining a capability of a wireless communications system.

41. The apparatus of claim 39, wherein the configuration information comprises dynamic information from a time sensitive networking (TSN) system associated with the UE or a TSN traffic class associated with a quality of service (QoS) flow corresponding to the communication link.

42. The apparatus of claim 39, wherein the configuration information comprises subscription information associated with the UE.

43. The apparatus of claim 27, wherein the instructions are further executable by the processor to cause the apparatus to:
transmit the delay budget configuration based at least in part on a quality of service (QoS) associated with the UE, one or more QoS rules associated with the communication link, one or more uplink packet detection rules, one or more downlink packet detection rules, or any combination thereof.

44. The apparatus of claim 27, wherein the first variable delay budget is indicated as a fraction of a second variable delay budget.

45. The apparatus of claim 27, wherein the communication link corresponds to a quality of service (QoS) flow associated with the first latency type.

46. The apparatus of claim 27, wherein the traffic associated with the first latency type comprises time sensitive networking (TSN) traffic.

47. An apparatus for wireless communications at a radio access node, comprising:
a processor,
memory coupled with the processor; and
instructions stored in the memory and executable by the processor to cause the apparatus to:
identify a communication link for traffic associated with a first latency type between a user equipment (UE) and a core network node via the radio access node;
receive, from the core network node, a delay budget configuration indicating a first variable delay budget for communications of the first latency type between the radio access node and the core network node via the communication link, wherein receiving the delay budget configuration comprises receiving a first information element (IE) that indicates a total delay budget between the UE and the core network node for communications of the first latency type via the communication link and a second IE that indicates the first variable delay budget; and wherein the total delay budget and first variable delay budget are different; and
schedule a communication between the UE and the radio access node based at least in part on the first variable delay budget.

48. The apparatus of claim 47, wherein the instructions are further executable by the processor to cause the apparatus to:
identify an uplink variable delay budget for uplink communications of the first latency type via the communication link based at least in part on the delay budget configuration; and
identify a downlink variable delay budget for downlink communications of the first latency type via the communication link based at least in part on the delay budget configuration, wherein the communication between the UE and the radio access node is scheduled based at least in part on the uplink variable delay budget or the downlink variable delay budget.

49. The apparatus of claim 48, wherein the uplink and downlink variable delay budgets are different.

50. The apparatus of claim 47, wherein the first variable delay budget is indicated as a fraction of a second variable delay budget.

51. The apparatus of claim 47, wherein the communication link corresponds to a quality of service (QoS) flow associated with the first latency type.

52. The apparatus of claim 47, wherein the traffic associated with the first latency type comprises time sensitive networking (TSN) traffic.

53. An apparatus for wireless communications at a core network node, comprising:
means for identifying a communication link for traffic associated with a first latency type between a user equipment (UE) and the core network node via a radio access node;
means for determining a first variable delay budget for communications of the first latency type between the radio access node and the core network node via the communication link; and
means for transmitting, to the radio access node, a delay budget configuration, wherein transmitting the delay budget configuration comprises transmitting a first information element (IE) that indicates a total delay budget between the UE and the core network node for communications of the first latency type via the communication link and a second IE that indicates the first variable delay budget; and wherein the total delay budget and first variable delay budget are different.

54. An apparatus for wireless communications at a radio access node, comprising:
means for identifying a communication link for traffic associated with a first latency type between a user equipment (UE) and a core network node via the radio access node;
means for receiving, from the core network node, a delay budget configuration indicating a first variable delay budget for communications of the first latency type between the radio access node and the core network node via the communication link, wherein receiving the delay budget configuration comprises receiving a first information element (IE) that indicates a total delay budget between the UE and the core network node for communications of the first latency type via the communication link and a second IE that indicates the first variable delay budget; and wherein the total delay budget and first variable delay budget are different; and
means for scheduling a communication between the UE and the radio access node based at least in part on the first variable delay budget.

55. A non-transitory computer-readable medium storing code for wireless communications at a core network node, the code comprising instructions executable by a processor to:
identify a communication link for traffic associated with a first latency type between a user equipment (UE) and the core network node via a radio access node;
determine a first variable delay budget for communications of the first latency type between the radio access node and the core network node via the communication link; and
transmit, to the radio access node, a delay budget configuration, wherein transmitting the delay budget configuration comprises transmitting a first information element (IE) that indicates a total delay budget between the UE and the core network node for communications of the first latency type via the communication link and a second IE that indicates the first variable delay budget; and wherein the total delay budget and first variable delay budget are different.

56. A non-transitory computer-readable medium storing code for wireless communications at a radio access node, the code comprising instructions executable by a processor to:
identify a communication link for traffic associated with a first latency type between a user equipment (UE) and a core network node via the radio access node;
receive, from the core network node, a delay budget configuration indicating a first variable delay budget for communications of the first latency type between the radio access node and the core network node via the communication link, wherein receiving the delay budget configuration comprises receiving a first information element (IE) that indicates a total delay budget between the UE and the core network node for communications of the first latency type via the communication link and a second IE that indicates the first variable delay budget; and wherein the total delay budget and first variable delay budget are different; and schedule a communication between the UE and the radio access node based at least in part on the first variable delay budget.

\* \* \* \* \*